(12) United States Patent
Nixon

(10) Patent No.: US 9,229,947 B2
(45) Date of Patent: Jan. 5, 2016

(54) METHODS AND APPARATUS TO MANAGE PROCESS DATA

(75) Inventor: Mark Nixon, Round Rock, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 180 days.

(21) Appl. No.: 12/891,133

(22) Filed: Sep. 27, 2010

(65) Prior Publication Data

US 2012/0078968 A1    Mar. 29, 2012

(51) Int. Cl.
*G06F 17/30* (2006.01)

(52) U.S. Cl.
CPC .................................. *G06F 17/301* (2013.01)

(58) Field of Classification Search
CPC ........... G05B 2219/31121; G05B 2219/31166; G05B 2219/31169; G05B 2219/31328; G05B 2219/32142; G05B 19/042; G05B 2219/31135; G05B 2219/25428; G05B 2219/3214; G05B 2219/25067; G05B 2219/31467; G05B 2219/31472; G05B 2219/32128; G05B 2219/32144; G06F 17/30905; G06F 9/5044; G06F 17/30997; G06F 9/4443; G06F 17/301; H04L 41/22; H04L 2012/2849; H04L 67/125; Y10S 707/99943
USPC ......... 707/712, 732, 736, 792, 802, 825, 940; 715/771
See application file for complete search history.

(56) References Cited

U.S. PATENT DOCUMENTS

| | | | |
|---|---|---|---|
| 5,390,314 A | 2/1995 | Swanson | |
| 5,796,602 A | 8/1998 | Wellan et al. | |
| 5,828,851 A | 10/1998 | Nixon et al. | |
| 5,864,870 A | 1/1999 | Guck | |
| 6,581,101 B2 | 6/2003 | Villalpando | |
| 6,618,630 B1 | 9/2003 | Jundt et al. | |
| 6,826,555 B2 * | 11/2004 | Nunez | 707/999.002 |
| 6,970,771 B1 | 11/2005 | Preiss et al. | |
| 7,089,491 B2 | 8/2006 | Feinberg et al. | |
| 7,096,224 B2 | 8/2006 | Murthy et al. | |
| 7,146,230 B2 | 12/2006 | Glanzer et al. | |
| 7,162,534 B2 | 1/2007 | Schleiss et al. | |

(Continued)

OTHER PUBLICATIONS

Pantoni et al. "Developing and implementing an open and non-proprietary device description for FOUNDATION fieldbus based on software standards". Available online Jul. 11, 2008. © 2008 Elsevier B.V. Computer Standards & Interfaces, vol. 31, Issue 2, Feb. 2009, pp. 504-514. http://dx.doi.org/10.1016/j.csi.2008.06.008.*

(Continued)

*Primary Examiner* — Jean B Fleurantin
*Assistant Examiner* — Evan Aspinwall
(74) *Attorney, Agent, or Firm* — Hanley, Flight & Zimmerman, LLC

(57) ABSTRACT

Example methods and apparatus to manage process control data are disclosed. A disclosed example method includes receiving a request for process data associated with a field device, searching a database for a descriptor file that includes the requested process data, and accessing the descriptor file to retrieve the process data to display within an application, wherein the process data is retrieved using a schema that specifies that the process data is located at an object referenced by a file entry that is part of a section of a file body included within the file. In the example method, the object may include at least one of an expression to calculate a value using the process data in a mathematical formula or a display transformation to instruct how the process data is to be displayed.

21 Claims, 11 Drawing Sheets

(56) References Cited

U.S. PATENT DOCUMENTS

| | | | |
|---|---|---|---|
| 7,178,103 | B2 | 2/2007 | Humphrey et al. |
| 7,251,534 | B2 | 7/2007 | Walls et al. |
| 7,317,952 | B2 | 1/2008 | Bhandiwad et al. |
| 8,205,022 | B2 * | 6/2012 | Isenmann et al. ............... 710/33 |
| 2003/0208587 | A1 | 11/2003 | Sauer |
| 2004/0225491 | A1 | 11/2004 | Chang |
| 2004/0230582 | A1 | 11/2004 | Pagnano et al. |
| 2004/0243933 | A1 | 12/2004 | Becker et al. |
| 2005/0071522 | A1 | 3/2005 | DeGroot |
| 2005/0120029 | A1 | 6/2005 | Tomic et al. |
| 2006/0074499 | A1 | 4/2006 | Hamidpour |
| 2006/0136812 | A1 | 6/2006 | Jones et al. |
| 2006/0259456 | A1 | 11/2006 | Falk et al. |
| 2007/0061786 | A1 * | 3/2007 | Zhou et al. .................... 717/136 |
| 2007/0067725 | A1 | 3/2007 | Cahill et al. |
| 2007/0075916 | A1 * | 4/2007 | Bump et al. .................... 345/3.1 |
| 2007/0078540 | A1 | 4/2007 | Bump et al. |
| 2007/0143330 | A1 | 6/2007 | Tang |
| 2007/0255520 | A1 | 11/2007 | Becker et al. |
| 2007/0282463 | A1 | 12/2007 | Hodson et al. |
| 2008/0112388 | A1 | 5/2008 | Garrett et al. |
| 2010/0121999 | A1 * | 5/2010 | Isenmann et al. ............. 710/105 |
| 2011/0022187 | A1 * | 1/2011 | Felts et al. ........................ 700/9 |
| 2011/0022978 | A1 * | 1/2011 | Keller ........................... 715/771 |

OTHER PUBLICATIONS

Unknown Author, "Why Should You Choose EDDL: Easier Calibration," EDDL, www.eddl.org Mar. 3, 2008, 2 pages.

Rolf Birkhofer, XML for Automotion Devices, A Multi-Schema Approach, XML Europe, May 21-25, 2001, 33 pages.

Terry Blevins, "EDDL Overview," NeSSI Meeting, EDDL, Feb. 16, 2007, 69 pages.

Martin Fowler, "Language Workbenches: The Killer-App for Domain Specific Languages?" martinfowler.com; Jun. 12, 2005, 24 pages.

Karlsruhe, "Welcome to the NAMUR EDDL Workshop with ECT," EDDL, May 22, 2006, 47 pages.

* cited by examiner

METHODS AND APPARATUS TO MANAGE PROCESS DATA

FIELD OF THE DISCLOSURE

The present disclosure relates generally to process control systems and, more particularly, to methods and apparatus to manage process data.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The controllers receive signals indicative of process measurements made by the field devices, process this information to implement a control routine, and generate control signals that are sent over the buses or other communication lines to the field devices to control the operation of the process. In this manner, the controllers may execute and coordinate control strategies or routines using the field devices via the buses and/or other communication links communicatively coupling the field devices.

Process data from the field devices and the controllers may be made available to one or more applications (i.e., routines, programs, etc.) executed by the operator workstation (e.g., a processor-based system) to enable an operator to perform desired functions with respect to the process, such as viewing the current state of the process (e.g., via a graphical user interface), evaluating the process, modifying an operation of the process (e.g., via a visual object diagram), etc. Many process control systems also include one or more application stations. Typically, these application stations are implemented using a personal computer, workstation, or the like that is communicatively coupled to the controllers, operator workstations, and other systems within the process control system via a local area network (LAN). Each application station may execute one or more strategies, routines, or applications that perform campaign management functions, maintenance management functions, virtual control functions, diagnostic functions, real-time monitoring functions, safety-related functions, configuration functions, etc. within the process control system.

Currently, a Field Device Integration (FDI) standard supports multiple process control communication protocols (e.g., Hart®, Foundation Fieldbus™, and Profibus®), which enables process control systems to manage field devices using a universal toolset. In some examples, the universal toolset may be implemented by Electronic Device Description Language (EDDL) files. The EDDL files provide a structured and/or standardized format to describe and specify functions of field devices. Process controllers and/or workstations may use EDDL files to facilitate interpretation, control and/or management of field devices. In other examples, the universal toolset may be implemented by defined client/server interfaces that exchange process data in a universal format.

SUMMARY

Example methods and apparatus to manage process data are described. In one example, a method includes receiving a request for process data associated with a field device and searching a database for a descriptor file that includes the requested process data. The example method also includes accessing the descriptor file to retrieve the process data to display within an application, wherein the process data is retrieved using a schema that specifies that the process data is located at an object referenced by a file entry that is part of a section of a file body included within the descriptor file.

In another example, a method includes receiving process data transmitted by a field device that is to be stored within the descriptor file and determining a relationship between the process data. The example method also includes creating a file body for the descriptor file, creating an open-file-description for each physical file to be associated with the descriptor file based on a number of components associated with the field device, creating a section for the open-file-description that includes related portions of process data, and creating a file entry within the section. The example method further includes selecting an object type based on a type of the process data to be stored within the file entry, assigning an object associated with the selected object type to the file entry, and storing the process data to the object.

An example apparatus includes a file processor to search a database for a descriptor file that includes requested process data originated from a field device within a process control system. The example apparatus also includes a process data reader to access the descriptor file to retrieve the process data to display within an application, wherein the process data is located at an object referenced by a file entry that is part of a section of a file body included within the descriptor file.

DETAILED DESCRIPTION

Figure 1:
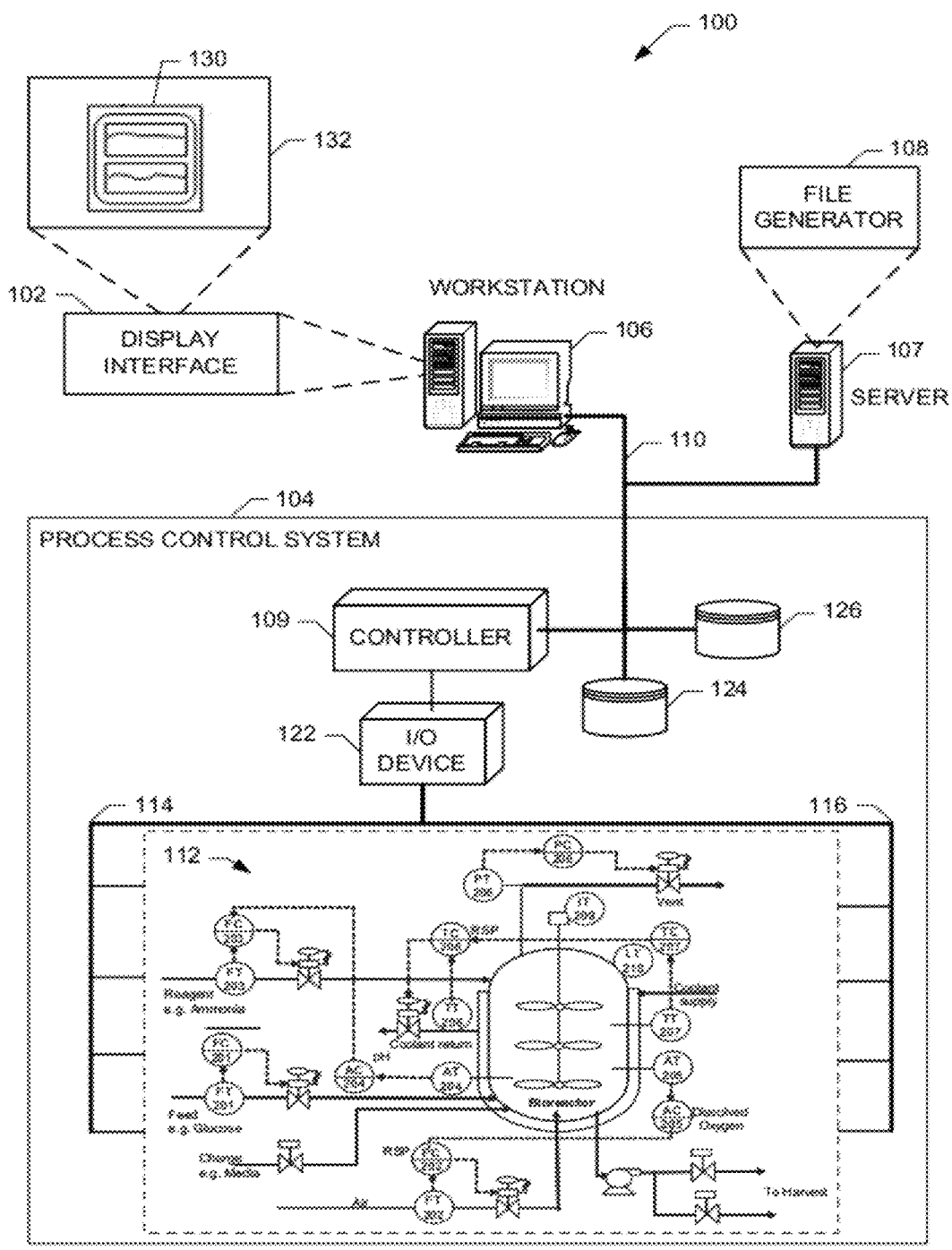
FIG. 1 shows a block diagram illustrating an example process control system including an example display interface and an example file generator.

Although the following describes example methods and apparatus including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the following describes example methods and apparatus, persons of ordinary skill in the art will readily appreciate that the examples provided are not the only way to implement such methods and apparatus. For example, while the example methods and apparatus are described in connection with managing process data, the example methods and apparatus are more generally applicable and may be implemented to manage data associated with any automation system, batch processing system, manufacturing system, industrial control system, safety instrumented system, etc.

Process control systems generally include controllers to perform routines, control strategies, and/or algorithms that manage field devices located in the control system. The field devices may be, for example, valves, valve positioners, switches and transmitters, and may perform process control functions such as opening or closing valves and measuring process control parameters. In addition to managing field devices, controllers may generate process data based on information received from the field devices. The process data may include process statistics, alarms, monitoring information, process trend information, diagnostic information, field device status information, and/or messages from the field devices.

Controllers transmit process data to applications operating on workstations so that operators may manage the process control system. Typically, applications display process data as at least one graphical data representation in a user interface. Data representations are helpful to operators as these data representations typically display process data graphically in the form of charts, graphs, data tables, list boxes, graphical symbols, text, etc. The data representations and corresponding text within the user interface are generally displayed in a format and/or language associated with a locale of an operator viewing the information.

In many known systems, workstations display process data from field devices using a corresponding electronic device description language (EDDL) file. In many instances, the EDDL files are transported to a process control environment along with a corresponding field device. In some examples, the EDDL files may be included within a field device and uploaded to a process control system upon installing the field device into the process control system. In these instances, a controller may store the EDDL files. Alternatively, each workstation coupled to the process control system may store a local copy of the EDDL files. In other examples, process control personnel may store EDDL files to a central database and access the EDDL files to display process data from a corresponding field device.

Currently, many well-known process control communication protocols support the use of EDDL files. These process control protocols include, for example, Foundation Fieldbus™, Hart® Communication Foundation, and Profibus®. Further, the Field Device Integration (FDI) standard supports the use of EDDL files to create a universal toolset used by process control personnel to manage field devices communicatively coupled together within control systems.

The EDDL is a text-based language that may be used to describe characteristics, parameters, and/or functions of field devices. This functionality may include, for example, menu system descriptions, general device information, diagnostics, performance analysis information, operational statistics, parameterization information, range setup information, simulation parameters, override information, calibration trim information, monitoring information, device security protocols, and/or reset information. Manufacturers of field devices use EDDL files to provide a standardized form and/or structure for host workstations and/or handheld devices to access and display process data independent of a communication protocol and/or a device operating system (e.g., Windows, Android, Blackberry OS, iOS, etc.).

While EDDL files specify how process data is to be displayed, EDDL files do not store process data. Currently, process data may be stored by a controller to a persistent storage system (e.g., a database). In many instances, stored process data may be organized by a field device that generated the process data, an area of a process control system, an identifier associated with the process data, a time the process data was generated, and/or any other arrangement specified by process control personnel. Additionally, process data may be stored in a format that is associated with a field device type that generated the process data, a communication protocol used to transport the process data, and/or a type of the process data.

EDDL files may reference database locations of stored process data to display the process data in a graphical representation. To reference process data, some EDDL files may have to specify a directory location of the process data within a database. Further, the EDDL files may have to specify a parameter and/or variable that matches a format of the process data. In this manner, EDDL files may have to be manually configured to reference the appropriate location(s) of desired process data. If the process data is migrated to a different location, EDDL files may have to be updated with the new location. Additionally, an application that retrieves process data may have to search the entire database. Searching the entire database may be inefficient and time consuming. Further, some applications may not be communicatively coupled to the database to enable a user to search for the process data.

Currently, many workstations, servers, processors, etc. within a process control system may utilize interfaces that convert process data into a universal format to enable applications to exchange process data in a standardized (e.g., common) format. For example, some applications may be configured for viewing process data generated by field devices compliant with the Hart® communication protocol. To transmit this process data to an application configured for viewing process data associated with the Foundation Fieldbus™ communication protocol, interfaces between the applications convert the process data into a format that is compliant with both communication protocols. While these interfaces may enable the exchange of process data, the interfaces are relatively complex and have to be updated for changes to any compliant communication protocol. Additionally, some interfaces may not properly convert all process data into a universal format.

The example methods and apparatus described herein utilize a common (e.g., universal and/or standardized) file format for storing process control data. The common file format includes a collection of process data that parameterizes one or more field devices within a process control system. The example common file format is utilized by the example methods and apparatus to create descriptor files that conform to an arrangement (e.g., an organization, architecture, and/or file structure) for storing process data. A descriptor file may be created for each field device within a process control system. Alternatively, a descriptor file may be created for a group of field devices within a process control area. The descriptor files may need a relatively small amount of memory to store process data, thereby enabling the descriptor files to be portable and stored locally to devices.

The example common file format utilized by the example methods and apparatus described herein includes a header portion and a data portion. In other examples, the common file format may include additional portions. The example header includes information that describes a descriptor file. This information may include, for example, a schema level of the common file format, version information, and/or capabilities of the descriptor file. The identification information within the header provides a validation that an application is reading an appropriate version of a descriptor file. In other words, the version information enables an application to determine if contents (e.g., process data) of a descriptor file are compatible with the application. In some examples, the methods and apparatus described herein may use the version information to convert a descriptor file to a version that is requested by a client (e.g., a user of a workstation associated with a process control system).

An application may also use identification information within the header to search for a descriptor file that matches a request for process data from a client. For example, a user may request to view process data associated with a pump field device in an application. The application uses an identifier of the field device included within the request to match to corresponding identification information within a header of a descriptor file. Additionally, an EDDL file may reference a descriptor file by identification information included within the header.

In addition to a header, the common file format specifies a data portion. The example data portion includes entries (e.g., blocks) of process data that describe characteristics of a field device. The process data may also include outputs from a field device. The example methods and apparatus described herein arrange process data within a descriptor file so that global objects are defined first. For example, the common file format structures process data in a hierarchy where global objects are defined relatively higher in the hierarchy while individual variables are defined relatively lower in the hierarchy. In this manner, relatively lower objects within a descriptor file may reference relatively higher objects that provide a global definition of the lower objects.

In some examples, entries within a descriptor file may be relatively complex by including, for example, bitmaps and/or multiple data fields with links to other objects. In an example, a descriptor file includes a file body that includes at least one physical file. The file body includes one or more open-file-descriptions that describe a respective physical file. An open-file-description is referenced by one or more sections that include one or more file entries. In this manner, a section may include a list of file entries.

Additionally, each file entry may include a variable that is associated with a feature, function, parameter, and/or component of a field device. A variable may be defined by, for example, a variable type field, a value field, and/or a quality field. The variable type field specifies a type of a variable (e.g., Boolean, Integer, Unsigned, Float, Double, Enum, ASCII, BitString, Time, Datetime, etc.). A value field stores process data described by the variable. The value field may include process data generated by a field device or, alternatively, process data that describes a feature, function, and/or parameter of a field device. The variable quality field may specify a likelihood of process data stored to a corresponding value field being within a specified threshold.

Further, a file entry may include an expression and/or a display transformation that performs an action on process data located in one or more variables. In this manner, process data may be stored to a descriptor file as a relatively complex formula and/or method, thereby providing applications flexibility to display process data stored within descriptor files. An expression may include, for example, a mathematical computation using process data stored in a variable. In some examples, an expression may be implemented by, for example, Jscript. A display transformation may include, for example, instructions that specify how process data associated with a variable is to be displayed. In some examples, a display transformation may be implemented using Extensible Stylesheet Language Transformation (XSLT).

A file entry may also include a reference to another section. In this manner, a descriptor file may include a nested hierarchy of file entries. For example, a file entry may be implemented as an object including, for example, a collection and/or a list of nested process data. In another example, a file entry may be implemented as an object including, for example, a value-array, a reference-array, and/or an entry-array. In these other examples, the file entry may include a count field that specifies a number of nested file entries, with each nested file entry including a reference to a variable. In other words, the value-array, reference-array, and/or an entry-array may be used to index a group of variables.

The example descriptor files implemented by the example methods and apparatus described herein are validated by a schema that provides a blueprint as to how process data is stored and retrieved. A schema is a type of document that expresses common file format requirements in terms of constraints on a structure and contents of descriptor files. For example, a schema may specify the relationship between a header, a data portion, an open-file-description, sections, file entries, and/or variables described above. In some examples, the common file format may be associated with an Extensible Markup Language (XML) and/or an XSLT format. In these examples, an XML schema may be implemented using any type of XML schema language including, for example, Document Definition Markup Language (DDML), Document Schema Definition Languages (DSDL), Document Structure Description (DSD), etc.

The example schema may arrange objects and/or variables within a descriptor file based on an organization of a corresponding field device. For example, a field device may include a temperature sensor, a pressure sensor, and an actuator. A corresponding descriptor file may include a single open-file-description for the field device with a section for the two sensors and a separate section for the actuator. A file entry for the sensor section includes an entry-array object that includes a nested section for the temperature sensor and a separate nested section for the pressure sensor. Each of these nested sections may include nested file entries referenced to variables that store process data generated from and/or parameterized for the respective sensor. The actuator section may include one or more file entries that reference variables associated with the actuator. In this manner, an arrangement of the descriptor file mirrors the hardware arrangement of the field device while conforming to example common file format specified by the example schema.

The example method and apparatus described herein use a schema as a guideline for generating and/or retrieving process data from descriptor files. By adhering to a schema, the example methods and apparatus enable descriptor files to be relatively more portable and/or useable by process control applications because the applications do not have to be supported by interfaces and/or specific communication protocols to utilize a descriptor file. Further, a common file format specified by a schema is relatively resistant to changes in process control technology because the process data hierarchy is independent of a specific communication protocol, field device, application type, and/or process control system.

In some examples, the methods and apparatus described herein may use descriptor files conforming to the common file format in conjunction with EDDL files to display process data. For example, the EDDL files may specify how process data stored in a descriptor file is to be displayed in an application. In these examples, the EDDL file may reference variables within the descriptor file. Because the descriptor file conforms to the example schema, the EDDL file may not have to be modified when a data location of the process data is modified. In other examples, the descriptor file may include device functionality, features, and/or display information, thereby making a corresponding EDDL redundant.

FIG. 1 shows a block diagram of an example process control environment 100 including an example display interface 102. The example display interface 102 displays process data stored within descriptor file(s). The display interface 102 is associated with a process control system 104. Additionally, the display interface 102 may be implemented by and/or included within a workstation 106. In other examples, the display interface 102 may be included within a server, a processor, a distributed computing network, and/or any other computing device(s) that may be communicatively coupled to the workstation 106.

The illustrated example also includes a server 107 hosting a file generator 108. The file generator 108 creates descriptor files in a universal (e.g., common) file format that conforms to a schema. While the file generator 108 is shown within the server 107, in other examples, the file generator 108 may be included within the workstation 106 and operate in parallel with the display interface 102.

The example workstation 106 and/or the example server 107 of FIG. 1 may include any computing device such as a personal computer, a laptop, a server, a controller, a personal digital assistant (PDA), a micro computer, etc. The example workstation 106 may also include any mobile computing device such as, for example, a cell phone, a smartphone, a PDA, a netpad, a field communication, etc. The workstation 106 and/or the server 107 may be implemented using any suitable computer system or processing system (e.g., the processor system P10 of FIG. 10). For example, the workstation 106 could be implemented using a single processor personal computer, single or multi-processor workstations, etc.

The example process control system 104 may include any type of manufacturing facility, process facility, automation facility, safety instrumented facility, and/or any other type of process control structure or system. In some examples, the process control system 104 may include multiple facilities located at different locations. Additionally, the example process control environment 100 may include other process control systems (not shown) that may be included within the same facility and/or located at a different facility.

The example process control system 104 includes a controller 109 that may be communicatively coupled to the workstation 106 and/or the server 107 via a local area network (LAN) 110. The LAN 110 may be implemented using any communication medium and/or protocol. For example, the LAN 110 may be based on a hardwired or wireless Ethernet communication scheme. However, any other suitable communication medium and protocol could be used. Furthermore, although the LAN 110 is shown, more than one LAN and/or wireless network and appropriate communication hardware may be used to provide redundant communication paths.

The process control environment 100 may include a firewall (not shown) to provide remote workstations (e.g., workstations outside of the process control environment 100) access to process data generated by the process control environment 100. The process control environment 100 may also include one or more routers (not shown) to communicatively couple workstations (not shown) to the LAN 110. The routers may also communicatively couple multiple process control systems.

The process control system 104 also includes field devices 112 (e.g., input and/or output devices). The field devices 112 may include any type(s) of process control component(s) capable of receiving inputs, generating outputs, and/or controlling a process. The field devices 112 may include control devices such as, for example, valves, pumps, fans, heaters, coolers, and/or mixers to control a process. Additionally, the field devices 112 may include measurement or monitoring devices such as, for example, temperature sensors, pressure gauges, concentration gauges, fluid level meters, flow meters, and/or vapor sensors to measure portions of a process. The field devices 112 receive instructions from the controller 109 via inputs 114 to execute a specified command and cause a change to the process implemented and/or controlled by the field devices 112. Furthermore, the field devices 112 measure process data, environmental data, and/or input device data and transmit the measured data via outputs 116 to the controller 109 as process data. This process data may include the values of variables corresponding to measured outputs from the field devices 112.

The field devices 112 may be associated with EDDL files that are accessible by the controller 109, the server 107, and/or the workstation 106. The EDDL files describe characteristics, functions, parameters, and/or features of the field devices 112. The workstation 106 can access the EDDL files to determine how to display process data stored within descriptor files.

The process control system 104 also includes an I/O device 122 (e.g., one or more I/O cards) to receive data from the field devices 112 and convert the data into communications capable of being processed by the example controller 109. Likewise, the I/O device 122 may convert data or communications from the controller 109 into a data format capable of being processed by the corresponding field devices 112.

The example controller 109 of FIG. 1 operates one or more control routines (e.g., process control algorithms, functions, and/or instructions) to manage the field devices 112 within the process control system 104. The control routines may include process monitoring applications, alarm management applications, process trending and/or history applications, diagnostic applications, batch processing and/or campaign management applications, statistical applications, streaming video applications, advanced control applications, safety instrumented applications, etc. The example controller 109 transmits process data (e.g., process control information) to the workstation 106. The process data transmitted by the controller 109 may include, for example, process control values, data values, alarm information, text, status information, diagnostic information, error messages, parameters, events, and/or device identifiers.

In some examples, the controller 109 may also transmit process data from the field devices 112 to a database 124. The database 124 may be implemented by Electronically Erasable Programmable Read-Only Memory (EEPROM), Random Access Memory (RAM), Read-Only Memory (ROM), and/or any other type of memory. The example database 124 may store substantially all the process data generated by the controller 109. The process data may be stored and/or organized based on an associated field device. For example, output values (e.g., process control information) associated with a PS101 pump speed parameter of a pump with a PUMP01 identifier may be stored within the database 124 indexed by the PUMP01 identifier and the PS101 parameters.

At least some of the process data stored within the database 124 may also be stored in descriptor files. The descriptor files are stored in a descriptor file database 126, which is communicatively coupled to the LAN 110. The descriptor file database 126 may be implemented by Electronically Erasable Programmable Read-Only Memory (EEPROM), Random Access Memory (RAM), Read-Only Memory (ROM), and/or any other type of memory. Further, the descriptor file database 126 may be implemented by a persistent storage system. While the example descriptor file database 126 is shown as a separate database within the process control system 104, in other examples, the descriptor file database 126 may be implemented locally within each workstation (e.g., the workstation 106) associated with the process control environment 100. Additionally or alternatively, the descriptor file database 126 may be included within the server 107 and/or the controller 109.

The example descriptor file database 126 stores descriptor files that are configured to store process data in a common file format. The descriptor file database 126 may include a descriptor file for each of the field devices 112 or, alternatively, for a group of the field devices 112. The example descriptor files are generated by the example file generator 108. Process data may be stored to the descriptor files via the controller 109. For example, process data generated by one of the field devices 112 may be stored by the controller 109 to a respective descriptor file. Process data may also be stored to the descriptor files via the server 107. For example, parameterization information associated with one of the field devices may be stored by the server 107 and/or the workstation 106 to the respective descriptor file when a corresponding field device is installed and/or activated within the process control system 104. In this manner, a descriptor file may store real-time process data that describes an event, a status, and/or measured value and may store configuration information associated with the field device. Additionally, a descriptor file may store information defining features, functions, components, and/or display information associated with a corresponding field device.

The example workstation 106 may access the example descriptor file database 126 to retrieve, manage, and/or display stored process data. Other workstations and/or handheld devices (not shown) may also access the database 126 for process data. In this manner, any computing device with access to the process control environment 100 may access the database 126 to manage, retrieve, and/or display process data. In instances where the descriptor file database 126 does not include a descriptor file with requested process data, the workstation 106 may access the database 124 for the process data.

The example workstation 106 and/or other workstations with access to the process control system 104 may be configured to view, modify, and/or correct one or more processes within the process control system 104 via one or more applications. In the illustrated example, an application 130 is displayed via a user interface 132. Applications may include an enterprise view application, a graphics studio application, an explorer application, and/or any other type of process control-based application. These applications 130 display process data within the workstation 106 via the user interface 132. The user interface 132 may include a graphical window (e.g., an application programming interface (API)) that may be displayed within the workstation 106 to show process control information displayed as graphical representation(s) (e.g., functional block diagrams and/or schematics). The workstation 106 may be capable of displaying more than one user interface 132 that may be communicatively coupled to the display interface 102.

In the illustrated example, the application 130 may utilize the common file format of the descriptor files within the descriptor file database 126 to retrieve, manage, and/or display process data. Because the process data is stored to a file format that is standardized based on a schema, the application 130 may access the descriptor file without a file-format-specific interface. In this manner, any application operating on the workstation 106 may access process data stored within descriptor files without having to convert, translate, and/or otherwise format the process data into a standard compliant with the application. Further, the application 130 may access process data stored in descriptor files regardless of a communication protocol used to communicate between the I/O device 122 and the field devices 112, a type of the field devices 112, a protocol of the field devices 112, and/or any other proprietary format associated with the process data when the process data is generated by the field devices 112.

In the example of FIG. 1, the file generator 108 creates descriptor files based on a type of process data to be stored, a relationship between process data to be stored, and/or an arrangement of process data generated from one of the corresponding field devices 112. The file generator 108 also uses the example schema to organize and/or arrange process data within a descriptor file. In some examples, the file generator 108 may receive inputs from process control personnel specifying how process data is to be organized. Additionally, the file generator 108 may validate a newly created descriptor file with the example schema. Upon creating descriptor files, the file generator 108 saves the descriptor files to the descriptor file database 126. The file generator 108 is described in further detail in conjunction with FIG. 2.

The example display interface 102 of FIG. 1 enables a user of the workstation 106 to manage process data stored in descriptor files. The example display interface 102 may receive a request from a user to view, access, and/or update process data. A user may specify one of the field devices 112 to cause the display interface 102 to locate a descriptor file associated with the field device 112. Alternatively, a user may specify a parameter and/or variable, causing the display interface 102 to locate descriptor files with matching parameters and/or variables. In yet other examples, a user may use the display interface 102 to browse a directory of descriptor files within the descriptor file database 126. A user may then view process data by selecting a desired descriptor file.

The example display interface 102 uses the example schema to locate requested process data within a descriptor file. Because the schema specifies how process data is to be stored, the example display interface 102 may apply the schema to search a descriptor file. In addition to retrieving process data, the example display interface 102 may enable a user of the workstation 106 to write to a descriptor file and/or modify process data stored within a descriptor file.

The example display interface 102 may also use display transformations within a descriptor file and/or a corresponding EDDL file to determine which of the retrieved process data is to be displayed within the application 130. To display process data, the example display interface 102 may render the process data within data fields of a template specified by an EDDL file and/or a display transformation. The display interface 102 may also generate a display file that includes instructions that the application 130 uses to generate graphical representations of the process data within a template. In this manner, the display interface 102 enables a user to relatively quickly retrieve and view process data stored in one or more descriptor files.

Figure 2:
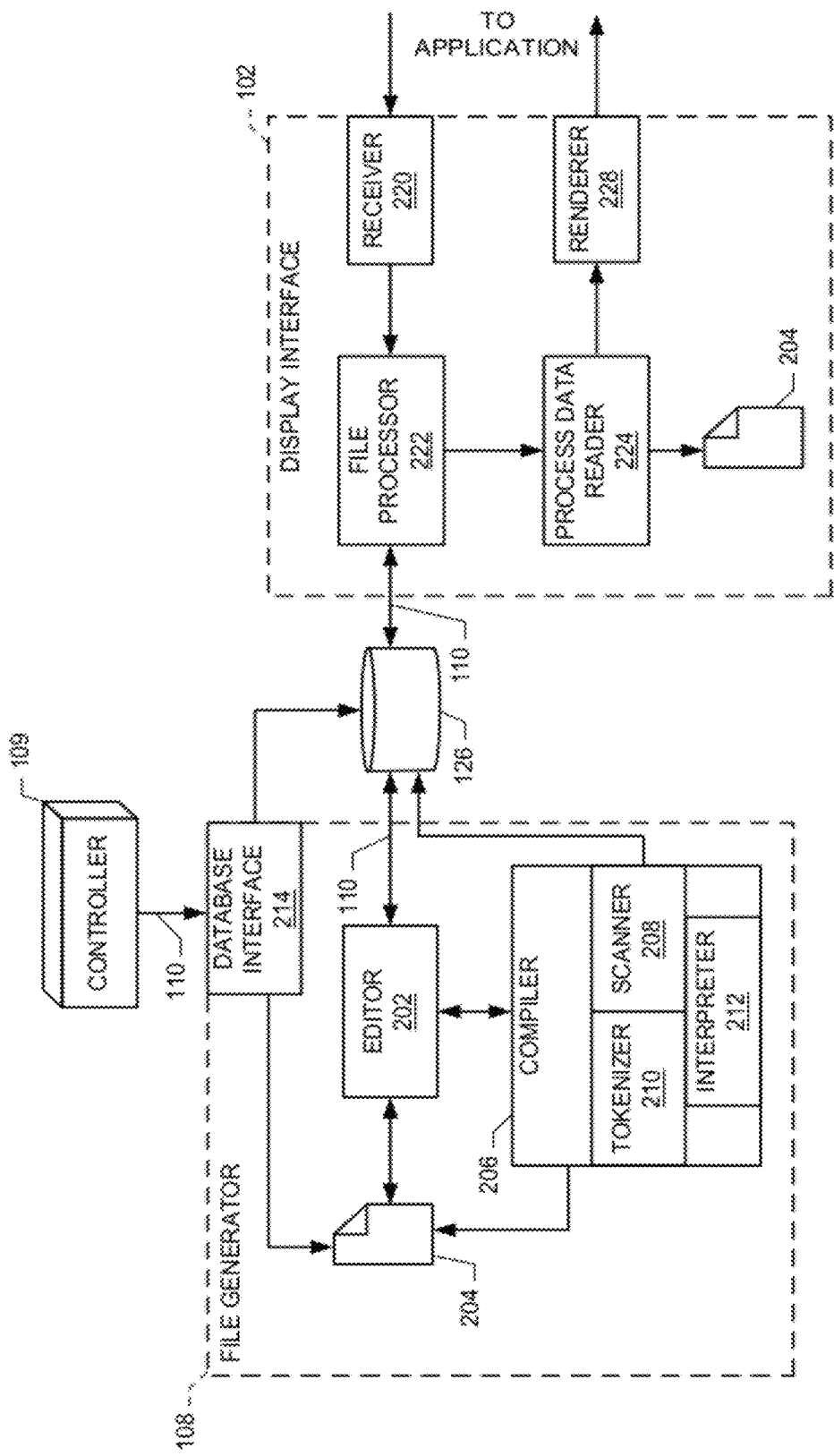
FIG. 2 shows functional block diagrams of the example display interface and the file generator of FIG. 1.

FIG. 2 shows functional block diagrams of the example display interface 102 and the file generator 108 of FIG. 1. While the descriptor file database 126 is shown external to the display interface 102 and the file generator 108, in some examples, the descriptor file database 126 may be included within the display interface 102 and/or the file generator 108. In other examples, the display interface 102 and/or the file generator 108 may include local copies of the descriptor file database 126.

The example file generator 108 creates descriptor files and stores process data to the descriptor files. The example file generator 108 may generate multiple descriptor files concurrently or, alternatively, process descriptor files in series. To create, modify, view, and/or edit descriptor files, the example file generator 108 includes an editor 202. The example editor 202 may function as an interface to enable a field device developer and/or process control personnel to create and/or modify descriptor files. In examples where the descriptor files are in an Extensible Stylesheet Language Transformation (XSLT) format and/or an Extensible Markup Language (XML) format, the editor 202 may be implemented using XMLSpy® from Altova®. In these other examples, the editor 202 may convert the descriptor files from an XML and/or XSLT format into a HyperText Markup Language (HTML) file. The display interface 102 may then access HTML formatted descriptor files in examples where the workstation 106 is communicatively coupled to the descriptor file database 126 via the Internet.

To create descriptor files, the example editor 202 may receive information describing functionality of the field devices 112. In other examples, a user may utilize the editor 202 to create a descriptor file based on specifications associated with the field devices 112. For example, the editor 202 may invoke a text editing application that a device designer may use to create a descriptor file. In other examples, the editor 202 may be a routine and/or algorithm that generates descriptor files based on the inputs 114, the outputs 116, process data stored within the database 124, and/or any additional information associated with the field devices 112. For example, the editor 202 may identify types of outputs from a field device and create a descriptor file to store outputted process data based on the output type. In some examples, the editor 202 may be used to create a descriptor file that stores process data based on features and/or functionality of one of the field devices 112. In other examples, the editor 202 may create a descriptor file that stores process data in a hierarchical manner based on features and/or functionality of the field devices 112 collectively.

The example editor 202 of the illustrated example creates descriptor files using a schema 204. The example schema 204 may be, for example, an XML file that provides a structure describing how process data within descriptor files is to be organized. The example schema 204 may be stored in a cache (e.g., memory) of the file generator 108 or, alternatively, may be stored in a memory of the server 107 of FIG. 1 and remotely accessed by the editor 202. The schema 204 is described in greater detail in conjunction with FIGS. 3 and 4.

To create a descriptor file for a field device, the example editor 202 uses information and/or process data associated with the field device to determine a file structure that conforms to the schema 204. The example editor 202 determines the file structure by determining a relationship between the process data that is to be stored to the descriptor file. To determine the relationship of the process data, the example editor 202 may determine a hierarchy of the process data by accessing an EDDL file associated with the field device. The EDDL file may be stored within the field device, the server 107, and/or in a database within the process control system 104. The EDDL file may specify which features, functions, and/or types of process data are related and/or are to be grouped together. The example editor 202 uses the relationship information within the EDDL file to create a file hierarchy using open-file descriptions, sections, file entries, and/or objects.

The example editor 202 may also determine a relationship of the process data based on which portions of the process data are associated with a component of a field device. In this manner, the example editor 202 groups portions of process data together within a same section that are associated with the same component. The example editor 202 may also use a hierarchy of the field device to determine how to structure the process data. For example, the editor 202 may nest objects and/or sections of a descriptor file to mirror nested components within a field device.

Further, the example editor 202 may determine a relationship of the process data by identifying a type of the process data. The example editor 202 may identify a type by determining if the process data corresponds to a numerical value, an array of values, a string of text, a Boolean value, a logic value and/or any other type of data. The example editor 202 may also select an object type for a descriptor file based on a type of the process data. For example, the editor 202 may select a value-array for process data that is associated with an array of numeric values. Based on a process data type, the example editor 202 may select an appropriate object from any number of objects including, for example, a value-array, a list, a collection, a reference array, an entry-array, a variable, an expression, and/or a display transformation. Further, the example editor 202 may select from any number of variable types based on a type of the process data. The variable value types include, for example, Boolean, integer, unsigned, float, double, Enum, ASCII, bitsting, time, and/or datetime.

After determining a relationship among the process data to be stored to a descriptor file, the example editor 202 creates a file body (e.g., a data portion) and a header for the descriptor file. The editor 202 creates the header based on identification information included within the process data. The editor 202 may also create fields within the header to specify a version of the descriptor file. The header may include, for example, a manufacturer name of a field device, a type of a field device, a major version of the descriptor file, a minor version of the descriptor file, a maintenance version of a field device, a build version of a field device, and/or a model number of a field device. A major version of the descriptor file may be used by the display interface 102 and/or the application 130 to determine compatible file entries within the descriptor file. A minor version of a descriptor file provides minor incremental versions for each major version. In this manner, relatively older applications may read descriptor files and use the major/minor version header information to determine compatible field entries. In other words, the header enables descriptor files to be backward compatible so that relatively older applications may only access process data that is compatible with the older applications. In some examples, if a major version of a descriptor file is incompatible with an application, the application may not be allowed to access the process data, thereby preventing the application from corrupting the descriptor file and/or improperly displaying process data.

The example editor 202 creates a file body by determining a number of physical files to associate with the descriptor file based on the relationship information. The number of physical files may correspond to a number of components of a field device. In other examples, the number of physical files may correspond to different features and/or functions associated with a field device. For example, a first physical file may be created for a pressure sensor and a second physical file may be created for a temperature sensor that are included within a valve controller field device. Each of the physical files are referenced and/or included within the file body of the descriptor file.

For each physical file, the example editor 202 references the physical file to the file body of the descriptor file using an open-file-description. The open-file-description includes identification information that identifies the physical file. The open-file-description also includes references to sections. The example editor 202 creates sections within open-file-descriptions based on the relationship between the process data. For example, the editor 202 may create a section for alarm and event process data for a sensor component and a section for output values of process data for the sensor component. The example editor 202 may include references to the created sections within the corresponding open-file-descriptions.

For each section, the editor 202 determines an object type for a file entry. The file entries are references within a section to objects. The editor 202 may select an object based on a type and/or relationship of the process data. Thus, a collection or list of process data may be stored to the descriptor file as a list or collection object referenced within a file entry. In examples where the process data may include a group and/or set of variables, parameters, and/or values, the editor 202 may determine that a file entry is to be associated with an array object. Based on a type of the group and/or set, the array may include a value-array, a reference-array, and/or an entry array. Each of these arrays may include a nested section with file entries of values, parameters, and/or variables. In this manner, the editor 202 may create nested sections and/or objects within a descriptor file.

Additionally, the editor 202 may create an expression object file entry within a section for process data that is to be included within a mathematical expression prior to being displayed and/or accessed. For example, the editor 202 may specify an object is to be an expression that converts a value of a variable from a numeric level of a tank into a percentage of tank capacity. The editor 202 may also create a display transformation object in examples where the descriptor file is to include instructions describing how stored process data is to be displayed. To create a display transformation object, the example editor 202 may create a reference in a file entry to a set of instructions.

To identify a section, the example editor 202 may assign a section name and/or a section index to the section. The section name may describe the section. The section index may be referenced to an open-file-description and/or may be referenced by file entries. To identify a file entry, the example editor 202 may assign an entry name, an entry type, and/or a count to the file entry. The entry name may be referenced by a section and describe the file entry. The entry type corresponds to an object type that is associated with the entry. The count may identify a number of items within an array object. If the file entry corresponds to a variable object, the editor 202 may assign a variable type, a value, and/or a quality to the variable. The variable type identifies a type of the process data. The value field within a variable object stores process data.

The example editor 202 arranges and/or organizes the sections, file entries, and/or corresponding objects based on the relationship of the process data. The example editor 202 utilizes the example schema 204 to ensure that the organization and/or arrangement of the descriptor file conforms to the rules and/or guidelines of the schema 204. In some examples, the editor 202 may rearrange the sections, file entries, open-file-descriptions if the relationship of the process data conflicts with the example schema 204.

Upon creating a descriptor file the example editor 202 transmits the descriptor file to a compiler 206. The example compiler 206 of FIG. 2 processes, compiles, checks, and/or translates the descriptor file for storage within the descriptor file database 126 and/or for use by the example display interface 102. The example compiler 206 includes a scanner 208 that uses any number and/or type(s) of algorithm(s), logic and/or methods to scan and/or parse descriptor files to identify syntax errors, protocol errors, and/or lexemes. The scanner 208 provides the lexemes to a tokenizer 210 to convert the descriptor file to a compressed binary format. Any errors detected by the scanner 208 may be communicated to a field device designer via the editor 202. The example scanner 208 may also validate the descriptor file using the example schema 204. Based on a type of error detected by the scanner 208, the example editor 202 provides tools for a field device designer to test and/or debug the detected errors. The editor 202 enables the field device designer and/or other process control personnel to edit descriptor files to correct any detected errors. In this manner, the example scanner 208 enables a field device designer to test and/or simulate a user interaction with descriptor files, which may result in improved quality of the descriptor files.

Using any number and/or type(s) of algorithm(s), logic and/or method(s), the example tokenizer 210 of FIG. 2 processes the lexemes identified by the scanner 208 to identify particular tokens (e.g., classifiable strings of input characters). For example, the scanner 208 may identify a string-of-letters lexeme representing, for example, a sentence, which the example tokenizer 210 parses and/or separates into one or more compressed binary words. Each token identified by the tokenizer 210 has a value (e.g., the actual name of a variable) and a type (e.g., a variable, an operator, a number, etc.), thereby enabling the tokenizer 210 to compress a descriptor file into a binary format. The compressed format may prevent tampering and/or subsequent processing issues by process control personnel. Because the tokenized descriptor file is relatively small, tokenized files for many field devices can be stored in a limited flash memory of a handheld device and/or the workstation 106.

The example file generator 108 of FIG. 2 also includes an interpreter 212 to translate a descriptor file into a vendor and/or system specific form. For example, interpreter 212 may be used to translate a descriptor file to a proprietary process control standard and/or any other standard requested by a process control manager. The file generator 108 may utilize the interpreter 212 to convert a descriptor file to a format compatible with the process control system 104 and/or applications within the workstation 106. For example, the interpreter 212 may convert a descriptor file to an HTML format that may be accessed by a web browser. In some examples, the interpreter 212 may translate a descriptor file prior to the tokenizer 210 compressing the descriptor file. In other examples, the interpreter 212 may translate a compressed binary descriptor file. The example interpreter 212 may use any number and/or type(s) of algorithm(s), logic and/or method(s) to translate descriptor files into a corresponding specified format. While the example interpreter 212 may translate a descriptor file, the underlying process data stored to the descriptor file conforms to the example common file format specified by the schema 204.

Upon scanning, tokenizing, and/or translating descriptor files, the example compiler 206 of the illustrated example stores a descriptor file to the descriptor file database 126. In some examples, the compiler 206 may store multiple translated versions of the same descriptor file, thereby enabling different applications associated with different formats and/or operating systems to access a compatible descriptor file. In other examples, the compiler 206 may store a compressed binary version and an uncompressed version of a descriptor file, thereby enabling a user to select a descriptor file based on memory constraints of a device.

To store process data to a descriptor file, the example file generator 108 includes a database interface 214. The database interface 214 is communicatively coupled to the controller 109 and the descriptor file database 126 via the LAN 110. The example database interface 214 is shown as being implemented within the file generator 108. In other examples, the database interface 214 may be included within the descriptor file database 126, a processor associated with the descriptor file database 126, the display interface 102, and/or as a separate processor and/or server within the process control system 104.

The example database interface 214 receives process data from the controller 109. The example database interface 214 may also receive process data from other sources (e.g., process control personnel, field device specification, etc.). The example database interface 214 uses identification information within the process data to identify a descriptor file. For example, process data from a pump field device with an identifier of PUMP023 may be used by the database interface 214 for search for a descriptor file with a header that includes the PUMP023 identifier.

After locating a descriptor file, the example database interface 214 may access the schema 204 to determine a structure of the descriptor file. The database interface 214 may use this defined structure for locating objects within the descriptor file to store the process data. Alternatively, the database interface 214 may scan the descriptor file for sections, open-file-descriptions, file entries, objects, and/or variable types that match the process data. For example, the database interface 214 may use the process data to locate a corresponding open-file-description within a file body of a descriptor file. The database interface 214 may then scan sections within the open-file-description for file entries that include objects that match the process data. The database interface 214 may match process data to an object by matching an identifier of the process data to a variable type and/or variable name. For example, a pump output may be generated as process data by tagging the value of the output (e.g., 3.2 gallons/second) to a parameter (e.g., PUMPOUT02). The example database interface 214 searches file entries for an object with a corresponding PUMPOUT02 identifier and/or name.

The example database interface 214 stores process data to the identified matching object within a file body of a descriptor file. To store the process data, the example database interface 214 stores a value of the process data to a value field of a variable object that may be nested within an array, collection and/or list object. In examples where the value field includes a previously stored value of process data, the database interface 214 overwrites the previous value. In other examples, the database interface 214 may store the new process data value in an array object that includes the previous process data value. The example database interface 214 may then close and/or terminate access to the descriptor file with the newly stored process data.

The example of FIG. 2 also shows the example display interface 102, which accesses the descriptor file database 126 for descriptor files to access process data. In some examples, the display interface 102 may periodically access the descriptor file database 126 to store descriptor files locally to a handheld device and/or the workstation 106. In this manner, a user may view and/or access process data without having a device communicatively coupled to the LAN 110. In other examples, the display interface 102 accesses the descriptor file database 126 for descriptor files any time a request to view process data is received.

The example display interface 102 may concurrently process multiple requests to access process data from workstations (e.g., the workstation 106). Alternatively, the example display interface 102 may process a single request to access process data. In these alternative examples, multiple display interfaces 102 may be utilized to process multiple requests. While the example display interface 102 is described in connection with the workstation 106, the display interface 102 may operate with other workstations and/or devices that are associated with the process control environment 100 of FIG. 1.

To receive a request to view process data, the example display interface 102 includes a receiver 220. The example receiver 220 is communicatively coupled to the user interface 132 within the workstation 106. The receiver 220 receives requests from a user to access and/or retrieve process data via the workstation 106 and/or the user interface 132. A user selects to access process data by entering an identifier associated with the desired data into a request and/or search field. For example, a user may enter an identifier of a field device. In another example, a user may enter an area and/or a collection of field devices within the process control system 104. In yet another example, a user may specify an identifier (e.g., a variable name) of a parameter to view process data associated with the parameter.

A user may also specify process data by browsing to a desired process control object (e.g., a listing of a field device, component, area, etc.) within a data directory. For example, a user may utilize an open function and navigate a directory to a desired field device. In yet other examples, a user may access process data by selecting a graphical representation and/or an identifier associated with the information via the user interface 132. Alternatively, a user may enter a website address that includes and/or lists process data. A user may then select a desired process control object listed within the displayed webpage.

Upon receiving a request to view process data, the example receiver 220 transmits the request to a file processor 222. The example file processor 222 parses the request into information to identify descriptor files. The file processor 222 uses the information to access the descriptor file database 126 to search for descriptor files that match the requested process data. For example, a request for process data may include a 'Rosemount® field device pressure sensor' type and a PRS02' identifier of the pressure sensor. The file processor 222 searches for descriptor files that define functionality for a Rosemount® field device pressure sensor. The file processor 222 also searches descriptor files that include a header with the PRS02 identifier. In some instances, a title and/or a file name of the descriptor file may include the type and/or the identifier. In other instances, metadata stored in a header of the descriptor file may include the type and/or the identifier. In yet other instances, the file processor 222 may have to search file entries and/or names of objects within the descriptor files for a matching type and/or identifier.

To retrieve the requested process data, the example display interface 102 of FIG. 2 includes a process data reader 224. The example process data reader 224 uses identifiers associated with the request to search a descriptor file for process data. The process data reader 224 receives the descriptor file from the file processor 222. The example process data reader 224 may also access the schema 204 to determine how the descriptor file is structured and/or arranged. The process data reader 224 may then use the arrangement information to relatively quickly access the process data from the description file without having to search irrelevant sections and/or physical files.

The example process data reader 224 retrieves process data by opening a descriptor file and scanning the descriptor file for a file entry with an object that matches a request. The process data reader 224 may use information within an open-file-description to select a physical file that corresponds to the requested process data. The process data reader 224 may then examine the sections within the open-file-description to identify which sections correspond to the request. For each section, the process data reader 224 may determine which file entries include objects with a name, a type, and/or an identifier that matches the request. The example process data reader 224 then retrieves the process data from the object. To retrieve the process data, the process data reader 224 copies the stored process data. The process data reader 224 continues to retrieve process data from the descriptor file until all of the requested process data is retrieved. In examples where a file entry object includes an expression, the example process data reader 224 executes and/or performs the operations specified by the expression. For example, the process data reader 224 may perform mathematical operations on a value of a variable specified by an expression object.

In examples where a request for process data causes the file processor 222 to locate two or more descriptor files, the example process data reader 224 retrieves process data from the respective descriptor files and aggregates and/or compiles the retrieved process data. The process data reader 224 may label and/or mark which process data was retrieved from which descriptor file. The process data reader 224 may then transmit the compiled process data to a renderer 228 for display.

The example renderer 228 generates a display for the requested process data. The example renderer 228 also accesses the database 124 for the requested process data that is not included within a descriptor file. To determine how the process data is to be displayed, the example renderer 228 may locate a corresponding EDDL file. The renderer 228 may match the process data to parameters and/or references within the EDDL file. The example renderer 228 generates graphics to display via the user interface 132 by executing instructions within the EDDL file. The renderer 228 may execute instructions to determine any menu, display, and/or format information.

The example renderer 228 also reads EDDL files for references to process data. In some examples, portions of an EDDL file may include a link and/or a file directory location that corresponds to process data stored in a descriptor file. For example, an EDDL file may include a pump speed data field. The EDDL file may also include a link to a pump speed variable object within a descriptor file. The example renderer 228 uses the link to insert the pump speed value (e.g., process data) from the descriptor file into a corresponding EDDL file to generate a graphical representation of the pump speed value.

The renderer 228 may also match types of process data to templates. In these examples, the renderer 228 may embed and/or insert process data into corresponding data fields. Each of the data fields may include a specification list describing the types of compatible process data. The renderer 228 may then generate a display file by compiling the process data within the data fields of the template. The display file specifies, for example, locations of process data, graphical representations of requested process data, and/or data fields.

Further, the example renderer 228 executes display transformation file entry objects specifying how process data is to be displayed. The renderer 228 may construct the display file based on the display transformation file entry objects. The example renderer 228 executes the display file to generate the described graphic with the corresponding process data. While the example renderer 228 is shown within the display interface 102 of FIG. 2, in other examples where the display interface 102 may be separate from a device to display process control information, the renderer 228 may be located within the device. In these examples, the renderer 228 transmits the display file (e.g., via the Internet and/or the LAN 110) to the device.

The example renderer 228 processes (e.g., renders) the display file into a format that is viewable by a user via, for example, the user interface 132. The example renderer 228 may generate a display based on a display size of a device (e.g., the workstation 106) that will display graphic(s) of the process control information. After rendering the display file, the example renderer 228 transmits the rendered display to the application 130 within the workstation 106 to display graphically the requested process control information.

While the example display interface 102 and the file generator 108 have been illustrated in FIG. 2, one or more of the servers, platforms, interfaces, data structures, elements, processes and/or devices illustrated in FIG. 2 may be combined, divided, re-arranged, omitted, eliminated and/or implemented in any way. Further, the example editor 202, the example schema 204, the example compiler 206, the example scanner 208, the example tokenizer 210, the example interpreter 212, the example database interface 214, the example receiver 220, the example file processor 222, the example process data reader 224, the example renderer 228 and/or, more generally, the example display interface 102 and/or the file generator 108 may be implemented by hardware, software, firmware and/or any combination of hardware, software and/or firmware. Thus, for example, any of the example editor 202, the example schema 204, the example compiler 206, the example scanner 208, the example tokenizer 210, the example interpreter 212, the example database interface 214, the example receiver 220, the example file processor 222, the example process data reader 224, the example renderer 228 and/or, more generally, the example display interface 102 and/or the file generator 108 could be implemented by one or more circuit(s), programmable processor(s), application specific integrated circuit(s) (ASIC(s)), programmable logic device(s) (PLD(s)) and/or field programmable logic device(s) (FPLD(s)), etc.

When any apparatus claim of this patent is read to cover a purely software and/or firmware implementation, at least one of the example editor 202, the example schema 204, the example compiler 206, the example scanner 208, the example tokenizer 210, the example interpreter 212, the example database interface 214, the example receiver 220, the example file processor 222, the example process data reader 224, and/or the example renderer 228 are hereby expressly defined to include a computer readable medium such as a memory, DVD, CD, etc. storing the software and/or firmware. Further still, the example display interface 102 and/or the file generator 108 may include one or more elements, processes and/or devices in addition to, or instead of, those illustrated in FIG. 2, and/or may include more than one of any or all of the illustrated elements, processes and devices.

Figure 3:
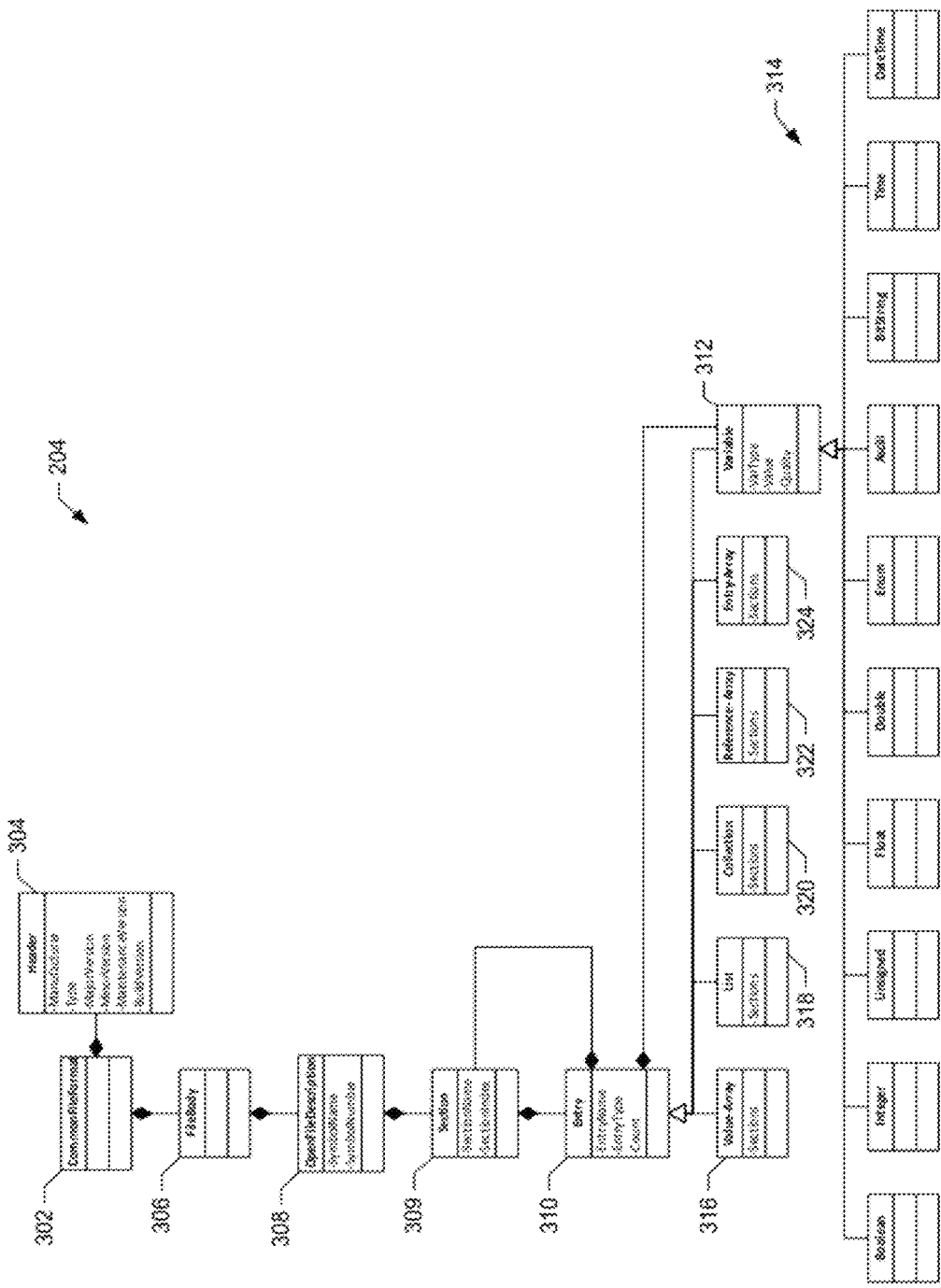
FIGS. 3 and 4 show an example schema that may be used by the example file generator of FIGS. 1 and 2 to create descriptor files.

FIG. 3 shows the example schema 204 of FIG. 2 depicted in a block model diagram. The example schema 204 shows a hierarchy for descriptor files. In other examples, the schema 204 may include other arrangements and/or hierarchies of blocks. The example display interface 102 may use the schema 204 to determine where process data is located within a descriptor file. While descriptor files may include different numbers of blocks, the relationships between the different types of blocks within the descriptor files is consistent with the example schema 204.

The example schema 204 includes a descriptor file instance 302 that is referred to as a common file format. The common file format refers to a universality of process data within a descriptor file that may be accessed by any type of process control application. The descriptor file instance 302 includes a header 304. The example header 304 is located at a relatively high level of the descriptor file instance 302 so that the display interface 102 only needs to access the descriptor file instance 302 to match a request for process data to information within the header 304. In this example, the header 304 includes fields for a manufacturer type of a field device associated with the descriptor file instance 302 and a type of the field device. The example header 304 also includes a major version, a minor version, a maintenance version, and a build version of the descriptor file instance 302. In other examples, the header 304 may include an identifier (e.g., a serial number) of the field device.

The descriptor file instance 302 also includes a file body 306. The file body 306 stores process data arranged in a hierarchical format. In many examples, one or more physical files of process data are stored to the file body 306. The example file body 306 includes an open-file-description 308 for each physical file. In the illustrated example, the open-file-description 308 includes a symbol name and a symbol number that may be used to reference the open-file-description 308 to the file body 306. The open-file-description 308 may also include fields for describing and/or generalizing stored corresponding process data.

The open-file-description 308 includes a section 309. While the example schema 204 shows the section 309, the open-file description 308 may include additional sections. The section 309 may include process data that is substantially similar, from a common component of a field device, and/or relatively related. The example section 309 includes a section name field and a section index field that may be referenced and/or indexed by the open-file-description 308. Alternatively, the section index may reference a number of file entries included within the section 309.

The example section 309 includes a file entry 310. While FIG. 3 shows the file entry 310, other examples may include multiple file entries included within the section 309. The example file entry 310 includes an entry name field, an entry type field, and a count field. The entry name field may identify the file entry 310 and be referenced by the section index. The entry type specifies an object type that is associated with the file entry 310. For example, the file entry 310 may be associated with a variable object 312, which includes a variable type field, a value field, and a quality field. The variable object 312 stores process data (e.g., statuses, values, events, parameter information, etc.) within the value field. The variable type field specifies a type of the variable object 312. An example of variable types 314 is shown that may be associated with the variable object 312.

Further, the file entry 310 may also include an expression object and/or a display transformation object (now shown). For example, an expression object may include a formula field and a value field. The formula field specifies a mathematical calculation to be performed on process data stored at a value field. In another example, the display transformation object may include an instruction field and a value field. The instruction field may include, for example, XSLT instructions for displaying process data stored within the value field.

The example file entry 310 may also include a value-array object 316, a list object 318, a collection object 320, a reference-array object 322, and an entry-array object 324. The example objects 316-324 are configured to store a set and/or a group of process data values. To store the set and/or group, the objects 316-324 include nested sections that include file entries that store the process data as nested variable objects. In this manner, the objects 316-314 use nested sections to store a group and/or array of process data. The nested sections include a format and hierarchy similar to the section 309 of the schema 204. Thus, the nested sections may include nested file entries that are associated with nested variable objects and/or nested arrays, collections, and/or lists. For example, the list object 318 may contain a nested section of file entries associated with variable objects. In another example, the value-array object 316 may contain a nested section of file entries indexed into an array of variable objects.

By using the example schema 204 of FIG. 3, the display interface 102 may locate process data relatively quickly by using the header 304 to match the descriptor file instance 302 to a request for process data. The display interface 102 may then scan the open-file-description 308 for the corresponding section 309 and scan the section 309 for the associated file entry 310 that includes one of the objects 312 and 316-324 that stores the requested process data. Because process data is stored in descriptor files that conform to the example schema 204, different applications (e.g., the application 130) may access process data via the display interface 102 regardless of the application type. In other words, the example schema 204 enables process data to be universally accessed without an interface and/or adaptor to convert the process data to a format readable by an application.

Figure 4:
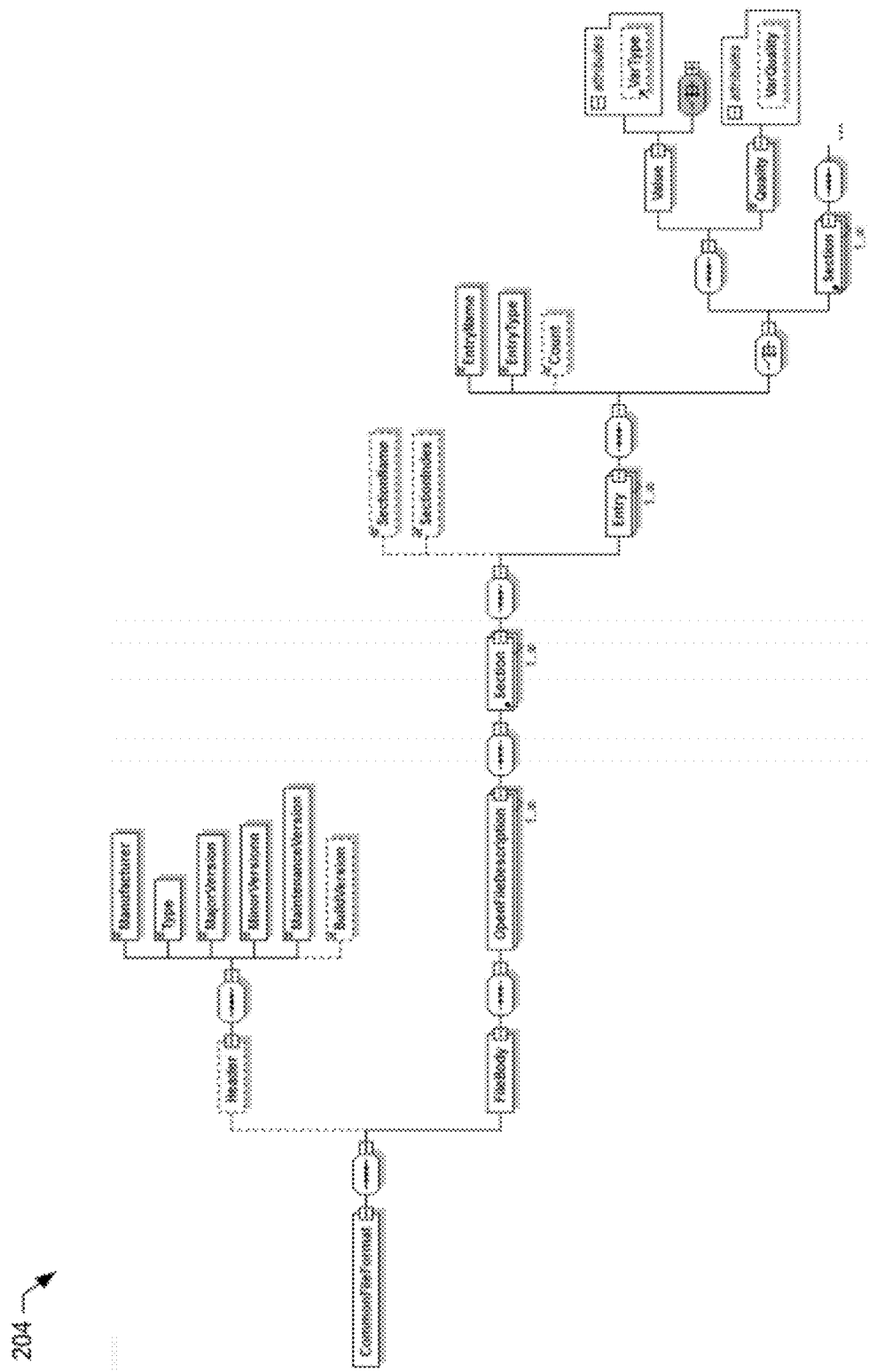

FIG. 4 shows the example schema 204 of FIG. 3 in an XML object model diagram. The structure of the schema 204 is similar to the block model diagram described in conjunction with FIG. 3. The instructions to implement the schema 204 in FIG. 4 are shown below:

```
<?xml version="1.0" encoding="UTF-8"?>
<!-- edited with XMLSpy v2010 rel. 3 sp1 (x64) (http://www.altova.com) by Emerson Process Management
(Emerson Process Management) -->
<!--W3C Schema generated by XMLSpy v2010 rel. 3 (x64) (http://www.altova.com)-->
<xs:schema xmlns:xs="http://www.w3.org/2001/XMLSchema">
    <xs:simpleType name="T_DateTime">
        <xs:restriction base="xs:string">
            <xs:maxLength value="20"/>
            <xs:pattern value="0x([0-9a-fA-F]{2})*"/>
            <xs:pattern value="\d\d:\d\d:\d\d"/>
            <xs:pattern value="(\d){1,2}-
((Jan)|(Feb)|(Mar)|(Apr)|(May)|(Jun)|(Jul)|(Aug)|(Sep)|(Oct)|(Nov)|(Dec))-\d\d\d\d \d\d:\d\d:\d\d"/>
        </xs:restriction>
    </xs:simpleType>
    <xs:simpleType name="T_EntryTypes">
        <xs:restriction base="xs:string">
            <xs:enumeration value="Collection"/>
            <xs:enumeration value="Entry-Array"/>
```

```xml
            <xs:enumeration value="List"/>
            <xs:enumeration value="Reference-Array"/>
            <xs:enumeration value="Value-Array"/>
            <xs:enumeration value="Variable"/>
        </xs:restriction>
</xs:simpleType>
<xs:simpleType name="T_AllVariableTypes">
    <xs:restriction base="xs:string">
        <xs:enumeration value="Integer"/>
        <xs:enumeration value="Unsigned"/>
        <xs:enumeration value="Float"/>
        <xs:enumeration value="Double"/>
        <xs:enumeration value="Enum"/>
        <xs:enumeration value="Bit-Enum"/>
        <xs:enumeration value="Ascii"/>
        <xs:enumeration value="BitString"/>
        <xs:enumeration value="Open-Date"/>
        <xs:enumeration value="Time"/>
        <xs:enumeration value="Date & Time"/>
        <xs:enumeration value="Time Value"/>
        <xs:enumeration value="Boolean"/>
    </xs:restriction>
</xs:simpleType>
<xs:simpleType name="T_VarQuality">
    <xs:restriction base="xs:string">
        <xs:enumeration value="good"/>
        <xs:enumeration value="bad"/>
        <xs:enumeration value="stale"/>
        <xs:enumeration value="uncertain"/>
    </xs:restriction>
</xs:simpleType>
<xs:complexType name="T_Section"/>
<xs:attribute name="VarType" type="T_AllVariableTypes"/>
<xs:attribute name="VarQuality" type="T_VarQuality"/>
<xs:element name="CommonFileFormat">
    <xs:complexType>
        <xs:sequence>
            <xs:element name="Header" minOccurs="0">
                <xs:complexType>
                    <xs:sequence>
                        <xs:element name="Manufacturer" type="xs:unsignedInt"/>
                        <xs:element name="Type" type="xs:unsignedInt"/>
                        <xs:element name="MajorVersion" type="xs:unsignedInt"/>
                        <xs:element name="MinorVersionn" type="xs:unsignedInt"/>
                        <xs:element name="MaintenanceVersion" type="xs:unsignedInt"/>
                        <xs:element name="BuildVersion" type="xs:unsignedLong" minOccurs="0"/>
                    </xs:sequence>
                </xs:complexType>
            </xs:element>
            <xs:element name="FileBody">
                <xs:complexType>
                    <xs:sequence>
                        <xs:element name="OpenFileDescription" maxOccurs="unbounded">
                            <xs:complexType>
                                <xs:sequence>
                                    <xs:element ref="Section" maxOccurs="unbounded"/>
                                </xs:sequence>
                            </xs:complexType>
                        </xs:element>
                    </xs:sequence>
                </xs:complexType>
            </xs:element>
        </xs:sequence>
    </xs:complexType>
</xs:element>
<xs:element name="Section">
    <xs:complexType>
        <xs:complexContent>
            <xs:extension base="T_Section">
                <xs:sequence>
                    <xs:element name="SectionName" type="xs:string" minOccurs="0"/>
                    <xs:element name="SectionIndex" type="xs:unsignedLong" minOccurs="0"/>
                    <xs:element name="Entry" maxOccurs="unbounded">
                        <xs:complexType>
                            <xs:sequence>
                                <xs:element name="EntryName" type="xs:string"/>
                                <xs:element name="EntryType" type="T_EntryTypes"/>
                                <xs:element name="Count" minOccurs="0">
                                    <xs:simpleType>
```

```
                <xs:restriction base="xs:unsignedLong">
    <xs:minInclusive value="0"/>
    <xs:maxInclusive value="100000"/>
    </xs:restriction>
                                        </xs:simpleType>
                                    </xs:element>
                                    <xs:choice>
                                        <xs:sequence>
                                            <xs:element name="Value">
<xs:complexType>
<xs:choice>
    <xs:element name="CFFInteger" type="xs:integer"/>
    <xs:element name="CFFUnsigned" type="xs:unsignedLong"/>
    <xs:element name="CFFFloat" type="xs:float"/>
    <xs:element name="CFFDouble" type="xs:double"/>
    <xs:element name="CFFEnum" type="xs:unsignedInt"/>
    <xs:element name="CFFAscii" type="xs:string"/>
    <xs:element name="CFFBitString" type="xs:string"/>
    <xs:element name="CFFTime" type="xs:dateTime"/>
    <xs:element name="CFFDateTime" type="T_DateTime"/>
    <xs:element name="CFFBoolean" type="xs:boolean"/>
</xs:choice>
<xs:attribute ref="VarType"/>
</xs:complexType>
                                            </xs:element>
                                            <xs:element name="Quality">
<xs:complexType>
<xs:simpleContent>
    <xs:extension base="xs:unsignedInt">
        <xs:attribute name="VarQuality" type="T_VarQuality"/>
    </xs:extension>
</xs:simpleContent>
</xs:complexType>
                                            </xs:element>
                                        </xs:sequence>
                                        <xs:element ref="Section" maxOccurs="unbounded"/>
                                    </xs:choice>
                                </xs:sequence>
                            </xs:complexType>
                        </xs:element>
                    </xs:sequence>
                </xs:extension>
            </xs:complexContent>
        </xs:complexType>
    </xs:element>
</xs:schema>
```

The example instructions representative of the schema 204 may be executed by the scanner 208 of FIG. 2 to validate a descriptor file. For example, the instructions may be used to ensure object types specified within a descriptor file are specified and/or defined within the schema 204 (e.g. <xs:simpleType name="T_EntryTypes">). Additionally, the instructions may be used to ensure types of values within a variable object are specified and/or defined within the schema 204 (e.g., <xs:simpleType name="T_AllVariableTypes">). This validation ensures that process data is stored in a format that accessible to most applications. Further, the instructions may be used to ensure a structure of the descriptor file matches a structure and/or relationship between open-file-descriptions, sections, file entries, and/or objects specified within the schema 204 (e.g., </xs:sequence>).

Figure 5:
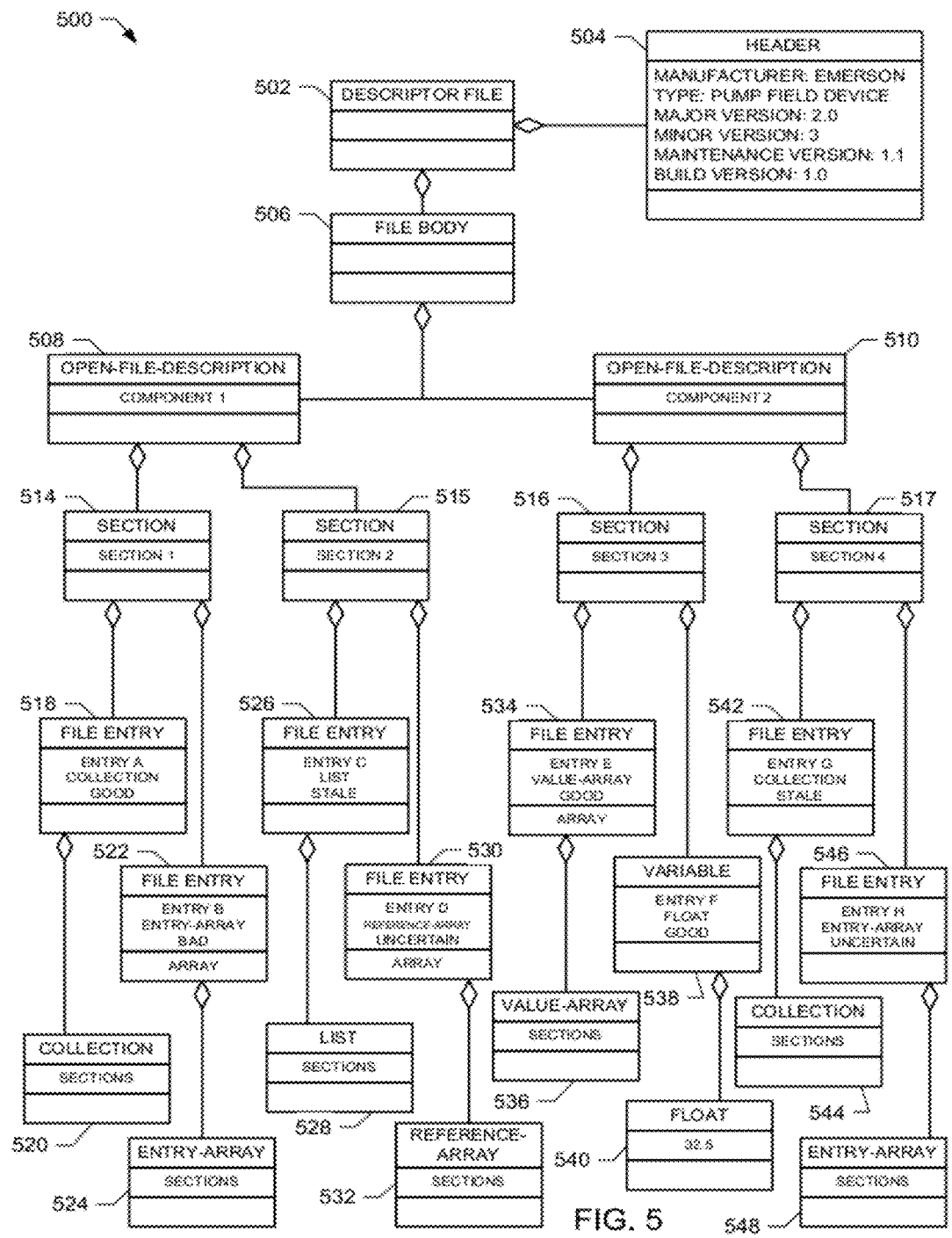
FIG. 5 shows an example descriptor file that conforms to the example schema of FIGS. 3 and 4.

FIG. 5 shows a block model diagram of an example descriptor file 500 that conforms to the example schema 204 of FIGS. 3 and 4. While FIG. 5 shows the example descriptor file 500, other examples may include additional or fewer open-file-descriptions, sections, file entries, and/or objects. The example descriptor file 500 stores process data in a universal and/or common format that may be accessed by many process control applications. In some examples, the descriptor file 500 and a corresponding EDDL may be stored to a mobile device. The mobile device may use the EDDL file to define how process data stored in a descriptor file is to be displayed. In this manner, process control personnel may access and/or view process data without having access to the process control system 104. Instructions to implement and/or define the example descriptor file 500 are shown below:

```
<?xml version="1.0" encoding="UTF-8"?>
<!--Sample XML file generated by XMLSpy v2010 rel. 3 sp1
(x64) (http://www.altova.com)-->
<CommonFileFormat
xsi:noNamespaceSchemaLocation="CFFSchema.xsd"
xmlns:xsi="http://www.w3.org/2001/XMLSchema-instance">
    <Header>
        <Manufacturer>Emerson</Manufacturer>
        <Type>Pump Field Device</Type>
        <MajorVersion>2.0</MajorVersion>
        <MinorVersionn>3</MinorVersionn>
        <MaintenanceVersion>1.1</MaintenanceVersion>
        <BuildVersion>1.0</BuildVersion>
    </Header>
    <FileBody>
        <OpenFileDescription>
            <SymbolName>Component 1</SymbolNam>
            <Section>
                <SectionName>Section 1</SectionName>
                <SectionIndex>4294967295</SectionIndex>
                <Entry>
                    <EntryName>Entry A</EntryName>
```

```
            <EntryType>Collection</EntryType>
            <Count>0</Count>
            <Value VarType="Integer">
                <CFFInteger>0</CFFInteger>
            </Value>
            <Quality VarQuality="good">0</Quality>
        </Entry>
        <Entry>
            <EntryName>Entry B</EntryName>
            <EntryType>Entry-Array</EntryType>
            <Count>0</Count>
            <Value VarType="Unsigned">
                <CFFInteger>0</CFFInteger>
            </Value>
            <Quality VarQuality="bad">0</Quality>
        </Entry>
    </Section>
    <Section>
        <SectionName>Section 2</SectionName>
        <SectionIndex>4294967295</SectionIndex>
        <Entry>
            <EntryName>Entry C</EntryName>
            <EntryType>List</EntryType>
            <Count>0</Count>
            <Value VarType="Float">
                <CFFInteger>0</CFFInteger>
            </Value>
            <Quality VarQuality="stale">0</Quality>
        </Entry>
        <Entry>
            <EntryName>Entry D</EntryName>
            <EntryType>Reference-Array</EntryType>
            <Count>0</Count>
            <Value VarType="Double">
                <CFFInteger>0</CFFInteger>
            </Value>
            <Quality VarQuality="uncertain">0</Quality>
        </Entry>
    </Section>
</OpenFileDescription>
<OpenFileDescription>
    <SymbolName>Component 2</SymbolNam>
    <Section>
        <SectionName>Section 3</SectionName>
        <SectionIndex>4294967295</SectionIndex>
        <Entry>
            <EntryName>Entry E</EntryName>
            <EntryType>Value-Array</EntryType>
            <Count>0</Count>
            <Value VarType="Enum">
                <CFFInteger>0</CFFInteger>
            </Value>
            <Quality VarQuality="good">0</Quality>
        </Entry>
        <Entry>
            <EntryName>Entry F</EntryName>
            <EntryType>Variable</EntryType>
            <Count>0</Count>
            <Value VarType="Bit-Enum">
                <CFFInteger>0</CFFInteger>
            <Value>32.5</Value>
            <Quality VarQuality="bad">0</Quality>
        </Entry>
    </Section>
    <Section>
        <SectionName>Section 4</SectionName>
        <SectionIndex>4294967295</SectionIndex>
        <Entry>
            <EntryName>Entry G</EntryName>
            <EntryType>Collection</EntryType>
            <Count>0</Count>
            <Value VarType="Ascii">
                <CFFInteger>0</CFFInteger>
            </Value>
            <Quality VarQuality="stale">0</Quality>
        </Entry>
        <Entry>
            <EntryName>Entry H</EntryName>
            <EntryType>Entry-Array</EntryType>
            <Count>0</Count>
            <Value VarType="BitString">
                <CFFInteger>0</CFFInteger>
            </Value>
            <Quality VarQuality="uncertain">0</Quality>
        </Entry>
    </Section>
</OpenFileDescription>
</FileBody>
</CommonFileFormat>
```

In the illustrated example, the descriptor file 500 includes a descriptor file instance 502. The descriptor file instance 502 includes a header 504 and a file body 506. The file body 506 includes a first open-file-description 508 corresponding to a first physical file storing process data generated by a Component 1 of a field device (e.g., <SymbolName>Component 1</SymbolNam>) and a second open-file-description 510 corresponding to a second physical file storing process data generated by a Component 2 of a field device (e.g., <SymbolName>Component 2</SymbolNam>). The first open-file-description 508 is partitioned into sections 514 and 515 and the second open-file-description 510 is partitioned into sections 516 and 517. The sections 514-517 may correspond to respective groups of related process data associated with the Components.

The section 514 is assigned a Section 1 section name and includes a file entry 518 (e.g., <EntryName>Entry A</EntryName>) that is associated with a collection object 520. The section 514 also includes a file entry 522 (e.g., <EntryName>Entry B</EntryName>) that is associated with an entry-array object 524. The example instructions listed above do not include instructions for a section with file entries for the objects 520 and 524. However, in other examples, the example collection object 520 and/or the entry-array object 524 may include one or more nested sections with nested file entries including variable objects that store process data. Each of the nested sections and/or file entries may be indexed by the Array field within the respective file entries 518 and 522.

The section 515 is assigned a Section 2 section name and includes a file entry 526 (e.g., <EntryName>Entry C</EntryName>) that is associated with a list object 528. The section 515 also includes a file entry 530 (e.g., <EntryName>Entry D</EntryName>) that is associated with a reference-array object 532. Similarly, the section 516 is assigned a Section 3 section name and includes a file entry 534 (e.g., <EntryName>Entry E</EntryName>) that is associated with a value-array object 536. The section 516 also includes a file entry 538 (e.g., <EntryName>Entry F</EntryName>) that is associated with a variable object 540. The variable object 540 is associated with a variable type of 'Float' and includes a stored numerical value '32.5' (e.g., process data).

Further, the section 517 is assigned a Section 4 section name and includes a file entry 542 (e.g., <EntryName>Entry G</EntryName>) that is associated with a collection object 544. The section 517 also includes a file entry 546 (e.g., <EntryName>Entry H</EntryName>) that is associated with an entry-array object 548. In this example, the collection object 520 stores a different group and/or set of process data than the collection object 544. Likewise, the entry-array object 524 stores a different array of process data than the entry-array object 548.

Figure 6:
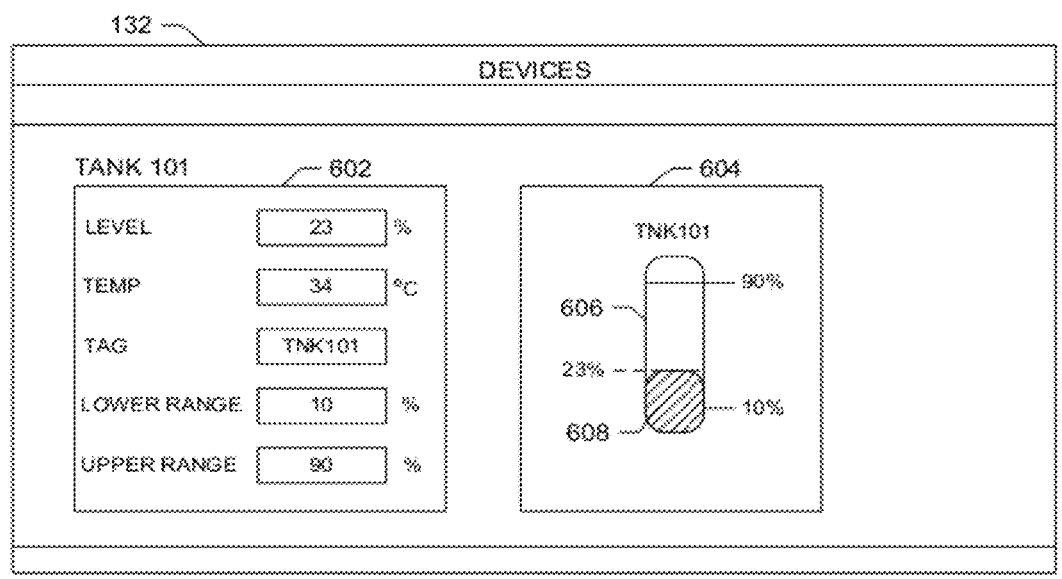
FIG. 6 shows an example application displaying process data retrieved from a descriptor file.

FIG. 6 shows the application 130 of FIG. 1 displaying process data stored in a descriptor file. In this example, a user may submit a request to view process data associated with a field device with a TANK 101 identifier. The example display interface 102 receives the request and locates a descriptor file that includes the TANK 101 identifier in a header. The display interface 102 may then use the example schema 204 of FIGS. 3 and 4 to search the descriptor file for the requested process data (e.g., Level, Temp, Lower Range, and Upper Range).

The Level parameter may specify how much liquid as a percentage is in the Tank 101 field device. The Temp parameter may specify a temperature of the liquid. The Lower Range parameter may specify a minimum threshold of fluid within the Tank 101 field device before an alarm is triggered. Similarly, the Upper Range parameter may specify a maximum threshold of fluid within the Tank 101 field device before an alarm is triggered. The example in FIG. 6 shows that a descriptor file may store process data measured by sensors within the Tank 101 field device (e.g., Level and Temp). The descriptor file also stores parameterization process data that defines characteristics of the Tank 101 field device (e.g., Lower Range and Upper Range). The process data may be stored within a value field of respective variable objects included within file entries of the descriptor file.

The example display interface 102 may also access an EDDL file associated with the Tank 101 field device to determine how the process data is to be displayed. For example, the EDDL file may specify that the process data is to be displayed numerically within a first panel 602 and graphically within a second panel 604. The EDDL file may also specify a location of data fields within the panels 602 and 604. The second panel 604 includes a tank graphic 606 that shows a fluid level 608 of the Tank 101 field device. Because the process data is stored as a common and/or universal file format to the descriptor file, the application 130 may display the process data within the panels 602 and 604 without having to convert the process data into a format specific to the application 130.

Flowcharts representative of example processes 700, 800, and 900 for implementing the display interface 102 and/or the file generator 108 of FIGS. 1 and 2 are shown in FIGS. 7, 8A, 8B, and 9. In this example, the processes 700, 800, and 900 may be implemented using machine readable instructions in the form of a program for execution by a processor such as the processor P12 shown in the example processor system P10 discussed below in connection with FIG. 10. The program may be embodied in software stored on a computer readable medium such as a CD-ROM, a floppy disk, a hard drive, a digital versatile disk (DVD), or a memory associated with the processor P12, but the entire program and/or parts thereof could alternatively be executed by a device other than the processor P12 and/or embodied in firmware or dedicated hardware. Further, although the example program is described with reference to the flowcharts illustrated in FIGS. 7, 8A, 8B, and 9, many other methods of implementing the example display interface 102 and/or the file generator 108 may alternatively be used. For example, the order of execution of the blocks may be changed, and/or some of the blocks described may be changed, eliminated, or combined.

As mentioned above, the example processes of FIGS. 7, 8A, 8B, and 9 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 7, 8A, 8B, and 9 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporary buffering, and/or for caching of the information). As used herein, the term non-transitory computer readable medium is expressly defined to include any type of computer readable medium and to exclude propagating signals.

Figure 7:
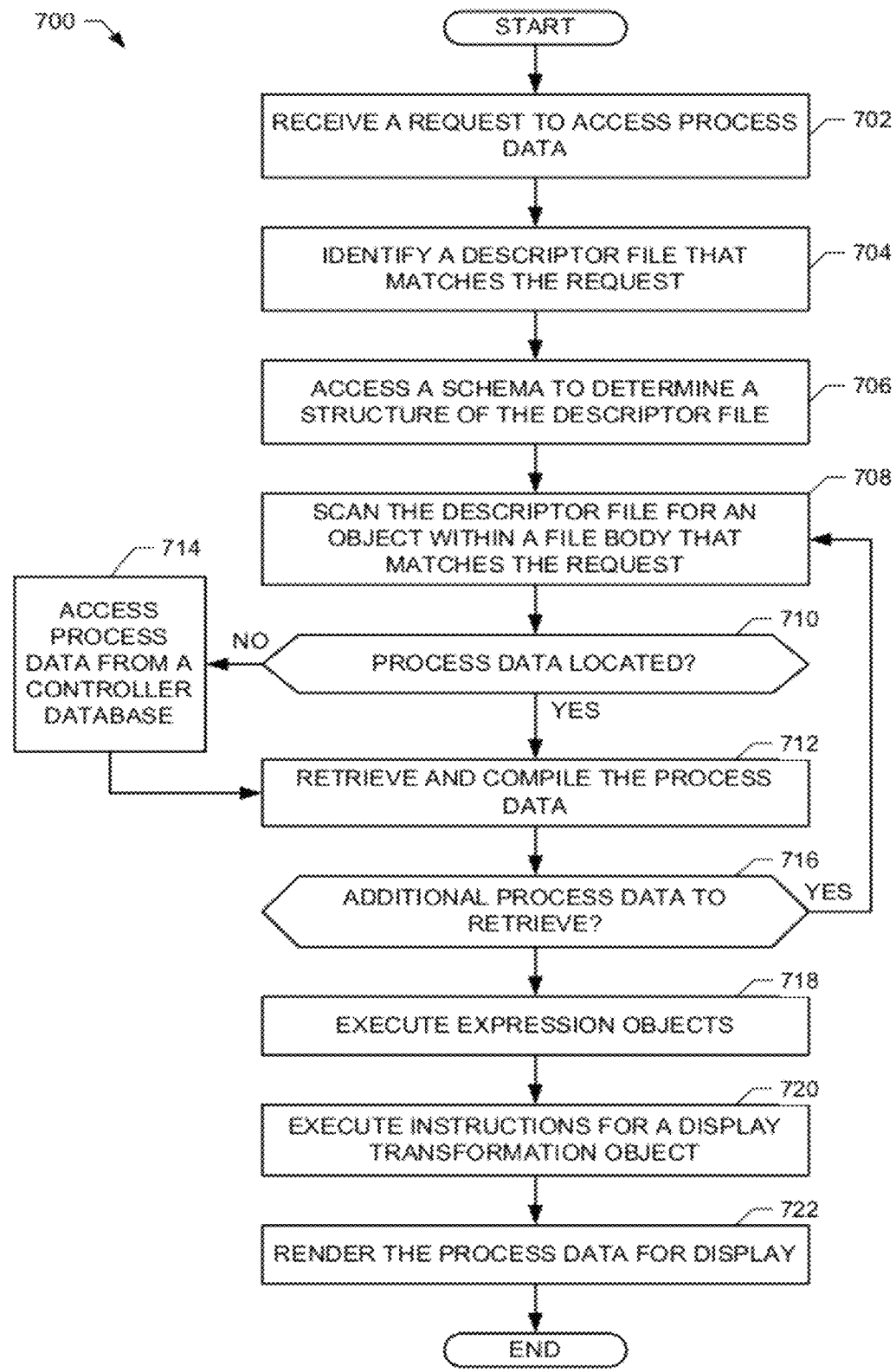
FIGS. 7, 8A, 8B, and 9 are flowcharts of example processes that may be used to implement the example display interface and/or the file generator of FIGS. 1 and/or 2.

The example process 700 of FIG. 7 retrieves process data stored in a descriptor file to display within an application. The example process 700 begins by receiving a request to access process data from a user (e.g., via the receiver 220) (block 702). The example process 700 searches for a descriptor file that includes a header that matches information included within the request (e.g., via the file processor 222) (block 704). The example process 700 then accesses a schema (e.g., the schema 204) to determine a structure of the retrieved descriptor file (e.g., via the process data reader 224) (block 706).

The example process 700 scans the descriptor file for an object within a file body that matches the request (e.g., via the process data reader 224) (block 708). The process 700 may locate an object by determining an open-file-description associated with the process data. Within the open-file-description, the process 700 then searches for a section that corresponds to the process data. The example process 700 may then search the section for a file entry with a variable object that includes a value field storing the requested process data. In some examples, the process 700 may scan the object for nested sections, file entries, and/or objects until a variable object with the matching process data is located. The object may include any array, list, collection, etc. that may store and/or index process data.

The example process 700 continues by determining if the process data is located within the descriptor file (e.g., via the process data reader 224 (block 710). If the example process 700 is unable to locate the process data within the descriptor file, the process 700 accesses the requested process data from a controller database (e.g., the database 124 of FIG. 1) (block 714). The controller database may store an aggregation of process data for the entire process control system 104. In some examples, searching the controller database may be inefficient and/or time consuming. Alternatively, the example process 700 may search other descriptor files. However, if the example process 700 is able to locate the requested process data (block 710), the process 700 retrieves and compiles the process data (e.g., via the process data reader 224) (block 712).

The example process 700 of FIG. 7 then determines if there is additional process data to retrieve (e.g., via the process data reader 224) (block 716). If there is additional process data, the example process 700 searches the descriptor file for a variable object that matches the requested process data (block 708). However, if there is no additional process data to retrieve, the example process 700 executes expression objects by performing calculations on process data specified by a formula within the object (e.g., via the process data reader 224) (block 718). If there are no expression objects, the example process 700 may skip block 718. Additionally, if the retrieved process data corresponds to a display transformation object, the example process 700 executes instructions specified by the object to display corresponding process data (e.g., via the process data reader 224 and/or the renderer 228) (block 720). The example process 700 then renders the process data for display within an application (e.g., via the renderer 228) (block 722). The example process 700 may render the process data for display by using an EDDL file that specifies how the process data is to be displayed within a template. The process 700 may compile the template with the process data to generate a display file that can be rendered or transmitted to an application to be rendered. Upon displaying the process data, the example process 700 terminates.

Figure 8A:
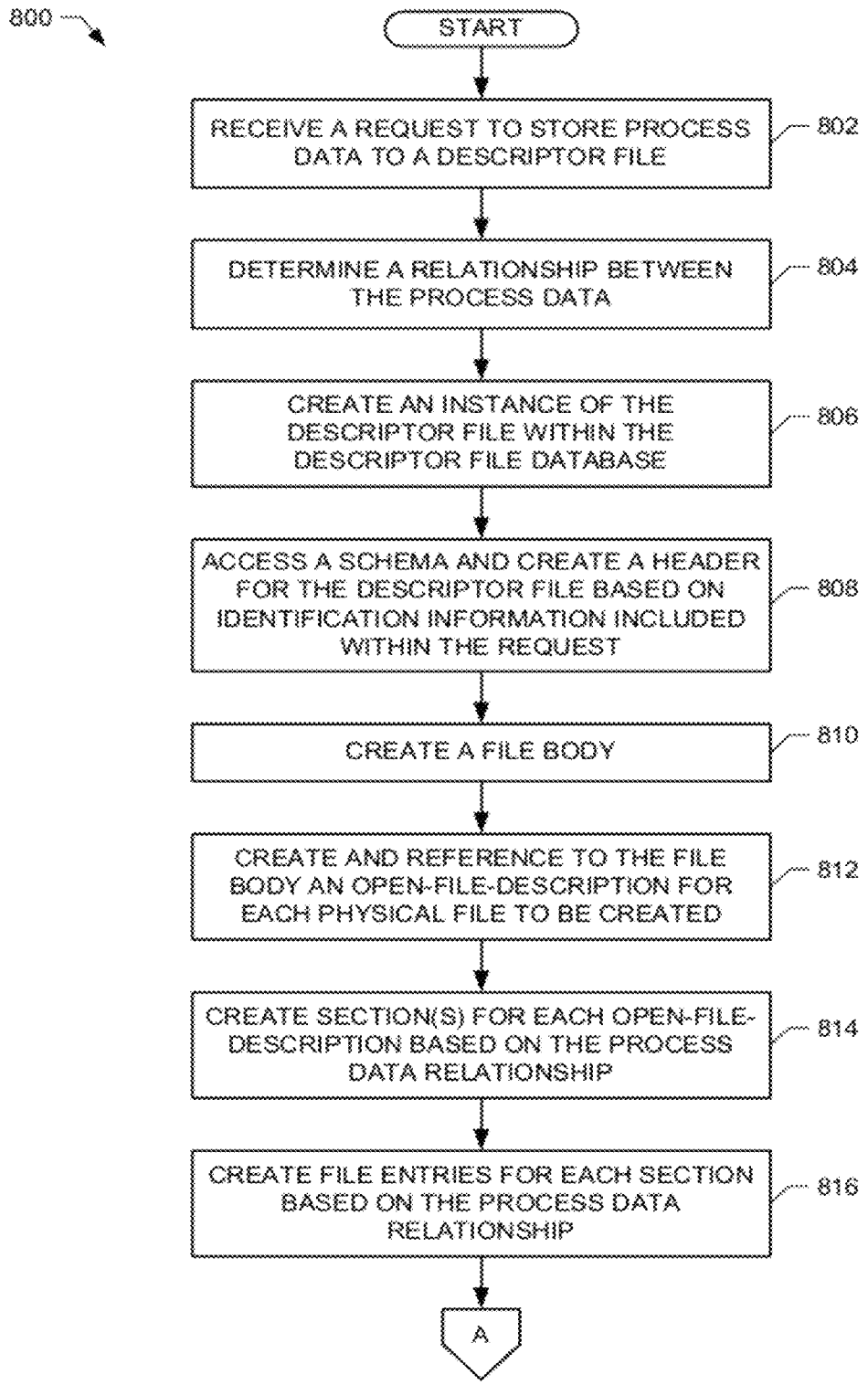
Figure 8B:
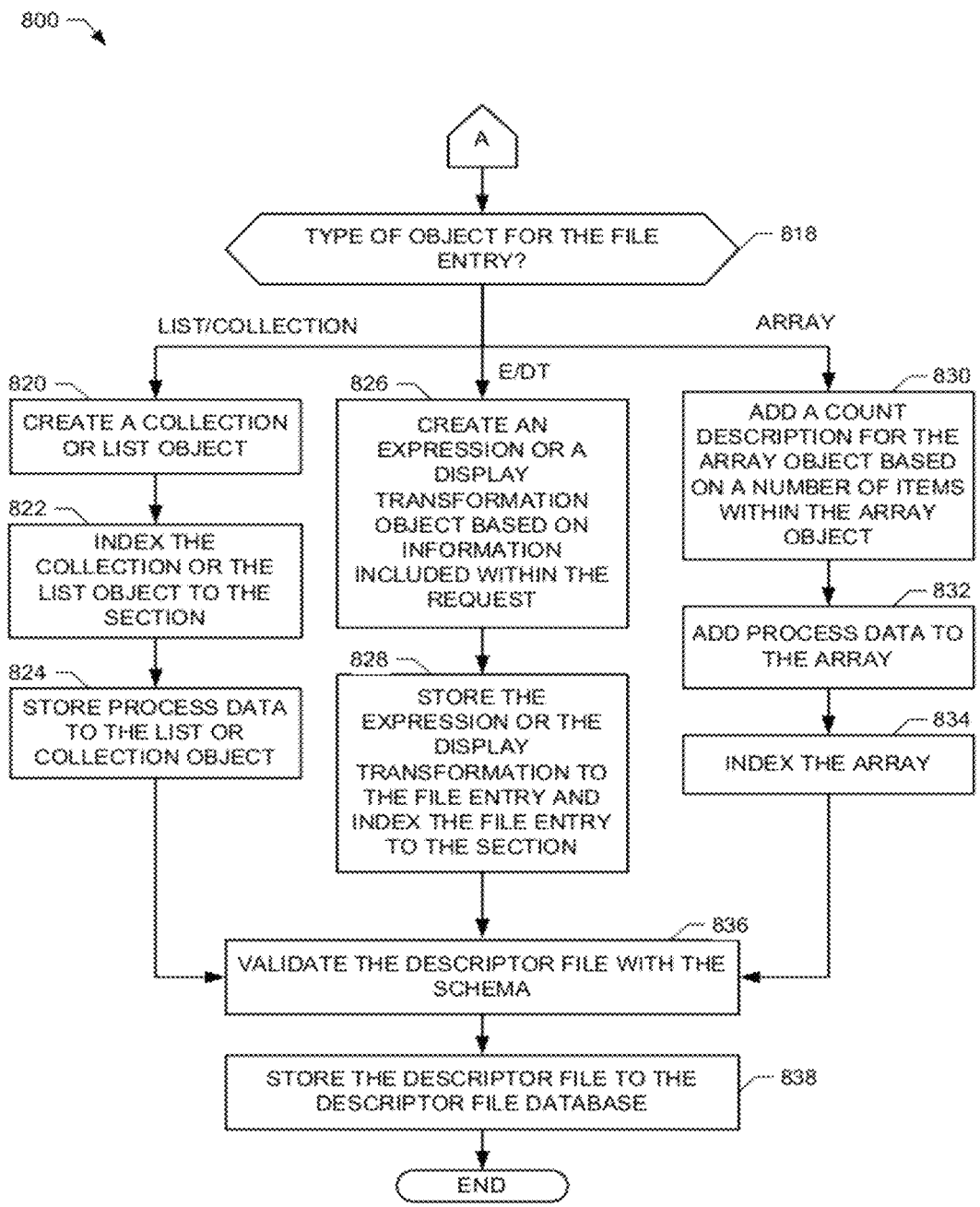

The example process 800 of FIGS. 8A and 8B create a descriptor file. The example process 800 may create the descriptor file in response to a request to store process data or, alternatively, in response by process control personnel to create the descriptor file. The example process 800 of FIG. 8A begins by, for example, receiving a request to store process data to a descriptor file (e.g., via the editor 202) (block 802). The example process 800 then determines a relationship between the process data (e.g., via the editor 202) (block 804). Determining the relationship may include identifying types of the process data, identifying process data associated within the same component of a field device, and/or identifying relatively similar process data.

The example process 800 then creates the descriptor file based on the relationships of the process data by creating an instance of the descriptor file within, for example, the descriptor file database 126 of FIGS. 1 and 2 (e.g., via the editor 202) (block 806). The example process 800 may create the instance based on a schema (e.g., the example schema 204 of FIGS. 3 and 4). The example process 800 then creates a header for the descriptor file based on identification information included within the process data and/or the request to create the descriptor file (e.g., via the editor 202) (block 808). The example process 800 may then create a file body (e.g., via the editor 202) (block 810).

The example process 800 uses the schema to create an open-file-description for each physical file to be created based on the relationship of the process data (e.g., via the editor 202) (block 812). The example process 800 may also reference the open-file-description(s) to the file body. For each open-file-description, the example process 800 creates one or more sections based on the schema and/or the relationship of the process data (e.g., via the editor 202) (block 814). For each section, the example process 800 creates at least one file entry based on the schema and/or the relationship of the process data (e.g., via the editor 202) (block 816).

The example process 800 of FIG. 8B continues by determining a type of an object to associate to each of the file entries (e.g., via the editor 202) (block 818). For process data that is to be stored in a collection and/or list object of a file entry, the example process creates the respective collection and/or list object within the file entry (e.g., via the editor 202) (block 820). The example process 800 then indexes the collection and/or the list object to the file entry and/or the corresponding section (e.g., via the editor 202) (block 822). The example process 800 may then store the process data to variable objects of nested file entries included within the collection and/or list object (e.g., via the editor 202 and/or the database interface 214) (block 824).

For process data that is to be stored in association with an expression and/or a display transformation object (e.g., E/DT), the example process 800 creates the respective expression object and/or the display transformation object based on the process data and/or information included within the request (e.g., via the editor 202) (block 826). The example process 800 may create the expression object by generating a mathematical formula provided by process control personnel and/or an EDDL file. Similarly, the example process 800 may create the display transformation object based on display information specified by an EDDL file and/or process control personnel. The example process 800 may then store the process data to the expression and/or display transformation object as a variable object, store the expression and/or display transformation object to the respective file entry, and index the file entry to the appropriate section (e.g., via the editor 202) (block 828).

For process data that is to be stored in an array (e.g., a reference-array, a value-array, and/or an entry array), the example process 800 generates a value for a count field for the object based on a number of file entries to store the process data (e.g., via the editor 202) (block 830). The example process 800 may then create nested sections and/or file entries to store the process data to variable objects included within the array object (e.g., via the editor 202 and/or the database interface 214) (block 832). The example process 800 may then index the nested file entries to the array object (e.g., via the editor 202) (block 834).

While the example process 800 describes creating relatively higher level sections, file entries, and/or objects, the example process 800 via blocks 812-834 may also create nested structures (e.g., sections, file entries, objects, etc.) based on the schema and/or the relationship of the process data. After creating the descriptor file, the example process 800 validates the descriptor file using the schema (e.g., via the scanner 208) (block 836). The example process 800 may also scan the descriptor file for errors, tokenize the descriptor file, and/or translate the descriptor file. If the validation detects any errors, the example process 800 may correct the errors and/or prompt process control personnel to correct the errors. After the descriptor file passes the validation, the example process 800 then stores the descriptor file to the descriptor file database 126 (e.g., via the editor 202 and/or the compiler 206) (block 838). The example process may then terminate.

Figure 9:
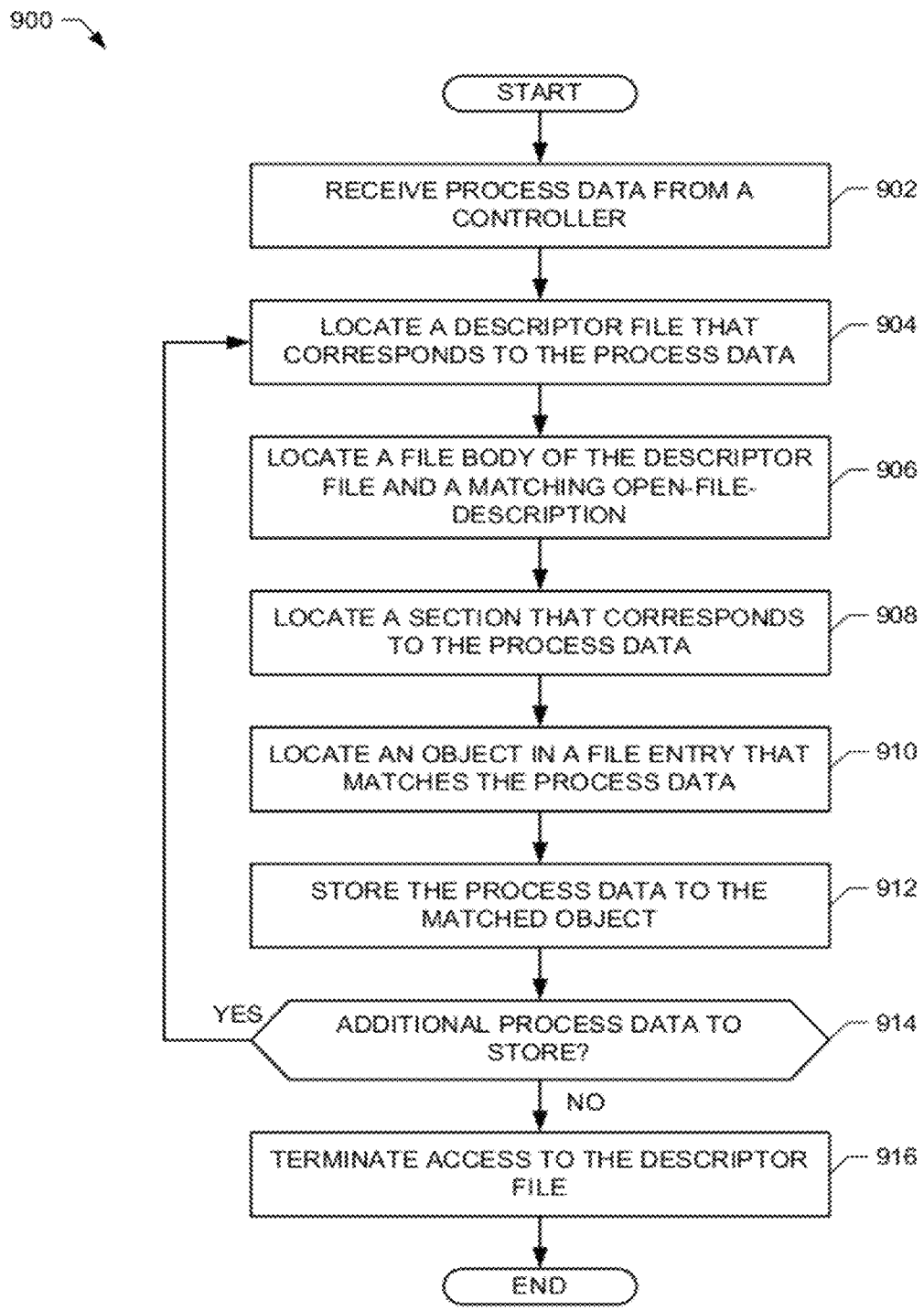

The example process 900 of FIG. 9 stores process data to an already created descriptor file. The example process 900 begins by receiving process data from a controller (e.g., via the database interface 214) (block 902). In other examples, the process 900 may receive process data from the database 124 of FIG. 1 and/or any other processor and/or server associated with the process control system 104. The example process 900 then locates a descriptor file in the descriptor file database 126 that corresponds to the received process data (e.g., via the database interface 214) (block 904). The example process 900 may use a header and/or names of variable objects to locate the matching descriptor file.

After locating a matching descriptor file, the example process 900 locates a file body and an open-file-description that corresponds to the process data to be stored (e.g., via the database interface 214) (block 906). The example process 900 then locates a section and an object within a file entry of the section that matches the process data to be stored (e.g., via the database interface 214) (blocks 908 and 910). In examples where the object includes nested sections and/or file entries, the example process 900 may locate the nested objects that correspond to the process data. The example process 900 may then store the process data to a value field of a variable object that matches the process data (e.g., via the database interface 214) (block 912).

The example process 900 of FIG. 9 continues by determining if there is additional process data to store. If there is additional process data, the example process 900 returns to block 904 and locates a corresponding descriptor file. However, if there is no additional process data to store, the example process 900 ends an access session with the descriptor file and/or stores the descriptor file with the newly added process data to the descriptor file database 126. The example process 900 may then terminate.

Figure 10:
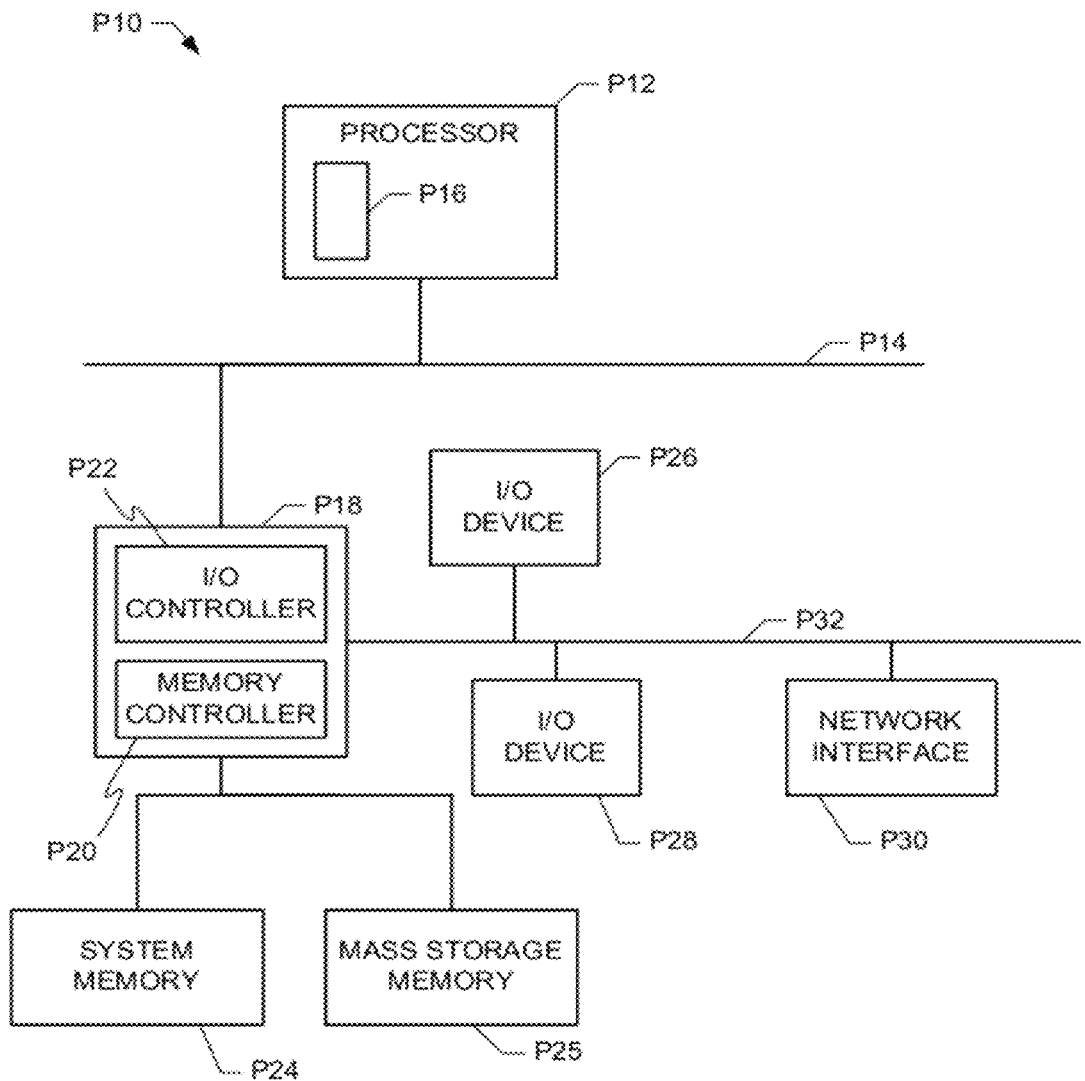
FIG. 10 is a block diagram of an example processor system that may be used to implement the example methods and apparatus described herein.

FIG. 10 is a block diagram of an example processor system P10 that may be used to implement the example methods and apparatus described herein. For example, processor systems similar or identical to the example processor system P10 may be used to implement the example editor 202, the example schema 204, the example compiler 206, the example scanner 208, the example tokenizer 210, the example interpreter 212, the example database interface 214, the example receiver 220, the example file processor 222, the example process data reader 224, the example renderer 228 and/or, more generally, the example display interface 102 and/or the file generator 108 of FIGS. 1 and/or 2. Although the example processor system P10 is described below as including a plurality of peripherals, interfaces, chips, memories, etc., one or more of those elements may be omitted from other example processor systems used to implement one or more of the example editor 202, the example schema 204, the example compiler 206, the example scanner 208, the example tokenizer 210, the example interpreter 212, the example database interface 214, the example receiver 220, the example file processor 222, the example process data reader 224, the example renderer 228 and/or, more generally, the example display interface 102 and/or the file generator 108.

As shown in FIG. 10, the processor system P10 includes a processor P12 that is coupled to an interconnection bus P14. The processor P12 includes a register set or register space P16, which is depicted in FIG. 10 as being entirely on-chip, but which could alternatively be located entirely or partially off-chip and directly coupled to the processor P12 via dedicated electrical connections and/or via the interconnection bus P14. The processor P12 may be any suitable processor, processing unit or microprocessor. Although not shown in FIG. 10, the system P10 may be a multi-processor system and, thus, may include one or more additional processors that are identical or similar to the processor P12 and that are communicatively coupled to the interconnection bus P14.

The processor P12 of FIG. 10 is coupled to a chipset P18, which includes a memory controller P20 and a peripheral input/output (I/O) controller P22. As is well known, a chipset typically provides I/O and memory management functions as well as a plurality of general purpose and/or special purpose registers, timers, etc. that are accessible or used by one or more processors coupled to the chipset P18. The memory controller P20 performs functions that enable the processor P12 (or processors if there are multiple processors) to access a system memory P24 and a mass storage memory P25.

The system memory P24 may include any desired type of volatile and/or non-volatile memory such as, for example, static random access memory (SRAM), dynamic random access memory (DRAM), flash memory, read-only memory (ROM), etc. The mass storage memory P25 may include any desired type of mass storage device. For example, if the example processor system P10 is used to implement the example descriptor file database 126 (FIGS. 1 and 2), the mass storage memory P25 may include a hard disk drive, an optical drive, a tape storage device, etc. Alternatively, if the example processor system P10 is used to implement the example descriptor file database 126, the mass storage memory P25 may include a solid-state memory (e.g., a flash memory, a RAM memory, etc.), a magnetic memory (e.g., a hard drive), or any other memory suitable for mass storage in the example descriptor file database 126.

The peripheral I/O controller P22 performs functions that enable the processor P12 to communicate with peripheral input/output (I/O) devices P26 and P28 and a network interface P30 via a peripheral I/O bus P32. The I/O devices P26 and P28 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The network interface P30 may be, for example, an Ethernet device, an asynchronous transfer mode (ATM) device, an 802.11 device, a DSL modem, a cable modem, a cellular modem, etc. that enables the processor system P10 to communicate with another processor system.

While the memory controller P20 and the I/O controller P22 are depicted in FIG. 10 as separate functional blocks within the chipset P18, the functions performed by these blocks may be integrated within a single semiconductor circuit or may be implemented using two or more separate integrated circuits.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media. To the extent the above specification describes example components and functions with reference to particular standards and protocols, it is understood that the scope of this patent is not limited to such standards and protocols.

Additionally, although this patent discloses example methods and apparatus including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example methods, systems, and machine-accessible medium, the examples are not the only way to implement such systems, methods and machine-accessible medium. Therefore, although certain example methods, systems, and machine-accessible medium have been described herein, the scope of coverage of this patent is not limited thereto. On the contrary, this patent covers all methods, systems, and machine-accessible medium fairly falling within the scope of the appended claims either literally or under the doctrine of equivalents.

What is claimed is:

1. A method to access process data, the method comprising:
receiving a request for process data generated by a field device;
searching a database, using a processor, for a descriptor file that includes the requested process data by searching for a header of the descriptor file that matches information included within the request;
retrieving, using the processor, the process data from the descriptor file by:
accessing a schema within the header that specifies that the process data is located at an object within the descriptor file;
locating a file body that corresponds to the process data within the descriptor file based on the schema;
locating a section that corresponds to the process data within the file body based on the schema;
locating a file entry that corresponds to the process data within the section based on the schema; and
locating the object that corresponds to the process data within the file entry based on the schema;
accessing, using the processor, an Electronic Device Description Language (EDDL) file for the field device to determine how the process data is to be displayed, the EDDL file including a reference to the process data based on the schema; and
generating a display file describing an arrangement of the process data based on the EDDL file.

2. A method as defined in claim 1, wherein the information included within the request is an identifier associated with the field device.

3. A method as defined in claim 1, wherein the header includes at least one of a manufacturer name, a type of the field device, a major version of the field device, a minor version of the field device, a maintenance version of the field device, a build version of the field device, or a model number of the field device.

4. A method as defined in claim 1, wherein the descriptor file is associated with an Extensible Markup Language (XML) format and the schema is associated with an XML schema.

5. A method as defined in claim 4, wherein the XML-formatted descriptor file conforms to the XML schema.

6. A method as defined in claim 1, wherein the process data is organized within the descriptor file in a first hierarchy corresponding to a second hierarchy of components within the field device that generated the process data.

7. A method as defined in claim 1, wherein the descriptor file describes the EDDL file associated with the field device.

8. A method as defined in claim 1, wherein the descriptor file is associated with a portable file format that is used by an application to display the requested process data on at least one of a wireless device or a workstation.

9. A method as defined in claim 1, wherein the process data is first process data, the descriptor file is a first descriptor file, the file body is a first file body, the section is a first section, the file entry is a first file entry, and the object is a first object, further comprising:
receiving a request to store second process data;
creating a second descriptor file corresponding to the second process data based on the schema;
creating a second file body within the second descriptor file based on the schema;
creating a second section within the second file body based on the schema;
creating a second file entry within the second section based on the schema;
creating a second object within the second file entry based on the schema; and
storing the second process data at a location of the second object within the second descriptor file in a format specified by a variable type associated with the second object.

10. A method as defined in claim 1, wherein the object is at least one of a value-array, a list, a collection, a reference array, an entry-array, or a variable.

11. A method as defined in claim 1, wherein the file body includes a file description that indicates an identifier of the file body.

12. A method as defined in claim 1, wherein the object includes a second section with a second file entry that lists a second object.

13. A method as defined in claim 1, wherein the object includes an expression to calculate a value based on the process data.

14. A method as defined in claim 1, wherein the object includes a display transformation to instruct how the process data is to be displayed.

15. An apparatus to access process data, the apparatus comprising:
a file processor to search a database for a descriptor file that includes requested process data originated from a field device within a process control system;
a process data reader to:
access a schema that specifies that the requested process data is located at an object within the descriptor file;
locate a file body within the descriptor file corresponding to the process data;
locate a section within the file body corresponding to the process data;
locate a file entry within the section that corresponds to the process data;
locate the object within the file entry that corresponds to the process data; and
retrieve the process data from the descriptor file;
a renderer to:
access an electronic device description language (EDDL) file for the field device to determine how the process data is to be displayed, the EDDL file comprising a reference to the process data based on the schema; and
generate a display file describing an arrangement of the process data based on the EDDL file; and
a processor to implement at least one of the file processor, the process data reader, or the renderer.

16. An apparatus as defined in claim 15, further comprising a receiver to receive a request for the process data.

17. An apparatus as defined in claim 15, wherein the descriptor file conforms to the schema that specifies the location of the process data based on a type of the process data.

18. An apparatus as defined in claim 15, wherein the file processor is to locate the descriptor file by matching a header of the descriptor file to an identifier associated with the field device included within the request.

19. An apparatus as defined in claim 15, wherein the process data reader retrieves the process data using a relationship of a data structure where the process data is generated within the field device to navigate through the descriptor file to the location of the process data.

20. An apparatus as defined in claim 15, wherein the renderer is to:
- generate the display file including the process data embedded within a template; and
- transmit the display file to an application that transmitted the request to display the process data.

21. An apparatus as defined in claim 15, wherein the process data is first process data, the descriptor file is a first descriptor file, the file body is a first file body, the section is a first section, the file entry is a first file entry, and the object is a first object, further comprising a database interface to:
- receive second process data from a controller communicatively coupled to the field device;
- locate a second descriptor file using an identifier that corresponds to the second process data;
- locate a second file body within the second descriptor file corresponding to the second process data;
- locate a second section within the second file body corresponding to the second process data;
- locate a second file entry within the second section that corresponds to the second process data;
- locate a second object within the second file entry that corresponds to the second process data; and
- store the second process data at a location of the second object in a format specified by a variable type associated with the second object.

* * * * *